(12) United States Patent
Bandishti

(10) Patent No.: US 12,260,080 B2
(45) Date of Patent: Mar. 25, 2025

(54) SYSTEM AND METHOD TO ALTER A USER INTERFACE OF A SELF-DRIVING VEHICLE IN CASES OF PERCEIVED EMERGENCY BASED ON ACCELERATIONS OF A WEARABLE USER DEVICE

(71) Applicant: Adeia Guides Inc., San Jose, CA (US)

(72) Inventor: Vinayaka Prakasha Bandishti, Hangal (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/116,086

(22) Filed: Mar. 1, 2023

(65) Prior Publication Data

US 2023/0205414 A1   Jun. 29, 2023

Related U.S. Application Data

(63) Continuation of application No. 17/313,517, filed on May 6, 2021, now Pat. No. 11,630,567, which is a continuation of application No. 16/118,317, filed on Aug. 30, 2018, now Pat. No. 11,029,837.

(51) Int. Cl.
| | |
|---|---|
| *G06F 3/0487* | (2013.01) |
| *B60K 35/28* | (2024.01) |
| *B60K 35/29* | (2024.01) |
| *G05D 1/00* | (2024.01) |
| *G06F 3/0346* | (2013.01) |

(52) U.S. Cl.
CPC ......... *G06F 3/0487* (2013.01); *G05D 1/0061* (2013.01); *G06F 3/0346* (2013.01); *B60K 35/28* (2024.01); *B60K 35/29* (2024.01); *B60K 2360/164* (2024.01); *B60K 2360/195* (2024.01)

(58) Field of Classification Search
CPC ... G06F 3/0487; G06F 3/0346; G05D 1/0061; G05D 2201/0213; B60K 2370/164; B60K 2370/195; B60K 2370/165; B60K 2370/175; B60K 2370/178; B60K 2370/589; B60K 35/00
See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,643,951 B1 | 2/2014 | Wheeler et al. |
| 8,909,428 B1 | 12/2014 | Lombrozo |
| 9,037,125 B1 | 5/2015 | Kadous |
| 9,092,093 B2 | 7/2015 | Jubner et al. |

(Continued)

*Primary Examiner* — Kenny Nguyen
(74) *Attorney, Agent, or Firm* — Haley Guiliano LLP

(57) ABSTRACT

Systems and methods are disclosed preventing accidents by altering user interfaces of self-driving vehicles based on movements of passengers in the self-driving vehicles. The system and methods generate for display media content on a user interface for a self-driving vehicle and determine whether a value of movement from a wearable user device of a user within the self-driving vehicle exceeds a threshold value (indicating the maximum value at which the self-driving vehicle removes the media content on the user interface). Responsive to a determination that the value of the movement from the wearable user device exceeds the threshold value, the system and methods remove the media content on the user interface for the self-driving vehicle.

19 Claims, 13 Drawing Sheets

(56) References Cited

U.S. PATENT DOCUMENTS

| | | |
|---|---|---|
| 9,219,901 B2 | 12/2015 | Mulholland et al. |
| 9,350,799 B2 * | 5/2016 | Wang .................... H04L 65/612 |
| 9,510,159 B1 | 11/2016 | Cuddihy et al. |
| 9,571,629 B2 | 2/2017 | Kadous |
| 9,832,306 B2 | 11/2017 | Kadous |
| 9,854,033 B2 * | 12/2017 | Wang .................... H01L 29/7869 |
| 9,961,189 B2 | 5/2018 | Kadous |
| 10,144,289 B2 | 12/2018 | Lee et al. |
| 10,150,386 B2 * | 12/2018 | Tan ....................... B60N 2/0027 |
| 10,375,229 B2 | 8/2019 | Kadous |
| 10,659,598 B2 | 5/2020 | Kadous |
| 10,955,855 B1 * | 3/2021 | Tran ....................... B60R 11/04 |
| 11,029,837 B2 | 6/2021 | Bandishti |
| 11,112,793 B2 * | 9/2021 | Frazzoli ............ B60W 60/0053 |
| 11,630,567 B2 | 4/2023 | Bandishti |
| 2002/0174430 A1 | 11/2002 | Ellis et al. |
| 2005/0196131 A1 * | 9/2005 | Narusawa ............ G10H 1/0083 |
| | | 386/241 |
| 2005/0251827 A1 | 11/2005 | Ellis et al. |
| 2010/0253918 A1 | 10/2010 | Seder et al. |
| 2011/0131520 A1 * | 6/2011 | Al-Shaykh ........ H04M 1/72412 |
| | | 715/771 |
| 2012/0062946 A1 | 3/2012 | Kitagata |
| 2012/0264415 A1 * | 10/2012 | Baldini ............. H04M 1/72403 |
| | | 455/420 |
| 2013/0336629 A1 | 12/2013 | Mulholland et al. |
| 2014/0113558 A1 | 4/2014 | Varoglu et al. |
| 2014/0289631 A1 | 9/2014 | Onaka |
| 2015/0149587 A1 * | 5/2015 | Wang .................... H04L 67/148 |
| | | 709/217 |
| 2015/0221194 A1 | 8/2015 | Sarkar |
| 2015/0288804 A1 * | 10/2015 | Kadous ................. G06F 3/0304 |
| | | 455/418 |
| 2015/0338926 A1 | 11/2015 | Park et al. |
| 2016/0197967 A1 | 7/2016 | Kreifeldt et al. |
| 2016/0239190 A1 * | 8/2016 | Forutanpour .......... G06F 1/1652 |
| 2016/0269476 A1 * | 9/2016 | Wang .................... H04L 65/612 |
| 2016/0311323 A1 | 10/2016 | Lee et al. |
| 2016/0320199 A1 | 11/2016 | Chen et al. |
| 2016/0337815 A1 | 11/2016 | Cuddihy et al. |
| 2017/0017392 A1 | 1/2017 | Castaneda et al. |
| 2017/0164051 A1 | 6/2017 | Han |
| 2017/0251260 A1 * | 8/2017 | Sanders ........... H04N 21/47217 |
| 2017/0264736 A1 | 9/2017 | Rajendran et al. |
| 2017/0269695 A1 | 9/2017 | Tokish et al. |
| 2017/0311109 A1 | 10/2017 | Rodrigs |
| 2017/0369071 A1 * | 12/2017 | Gould ..................... B60R 25/24 |
| 2018/0079284 A1 | 3/2018 | Choi et al. |
| 2018/0091585 A1 * | 3/2018 | Wang .................... H04L 67/52 |
| 2018/0173237 A1 | 6/2018 | Reiley et al. |
| 2018/0181359 A1 * | 6/2018 | Monroe ................. B60Q 3/80 |
| 2018/0244174 A1 * | 8/2018 | Tan .......................... B60N 2/22 |
| 2018/0349651 A1 | 12/2018 | Snediker et al. |
| 2018/0352372 A1 | 12/2018 | Swartz et al. |
| 2018/0365772 A1 | 12/2018 | Thompson et al. |
| 2019/0031027 A1 | 1/2019 | Pala et al. |
| 2019/0079199 A1 | 3/2019 | Tu et al. |
| 2019/0156364 A1 | 5/2019 | Yu |
| 2019/0294251 A1 * | 9/2019 | Chen ....................... G06F 1/163 |
| 2019/0346937 A1 | 11/2019 | Nagao et al. |
| 2020/0043341 A1 | 2/2020 | Shoda et al. |
| 2020/0073527 A1 | 3/2020 | Bandishti |
| 2020/0074492 A1 * | 3/2020 | Scholl .................... G06Q 50/30 |
| 2020/0180436 A1 | 6/2020 | Obiagwu et al. |
| 2020/0238827 A1 | 7/2020 | Greenberg et al. |
| 2020/0247327 A1 | 8/2020 | Ito |
| 2020/0393900 A1 | 12/2020 | Park et al. |
| 2021/0067119 A1 * | 3/2021 | Gadde ..................... G10L 17/00 |
| 2021/0154430 A1 | 5/2021 | Lev et al. |
| 2021/0271365 A1 | 9/2021 | Bandishti |

\* cited by examiner

1700

SYSTEM AND METHOD TO ALTER A USER INTERFACE OF A SELF-DRIVING VEHICLE IN CASES OF PERCEIVED EMERGENCY BASED ON ACCELERATIONS OF A WEARABLE USER DEVICE

CROSS-REFERENCE TO RELATED APPLICATIONS

This application is a continuation of U.S. patent application Ser. No. 17/313,517, filed May 6, 2021, which is a continuation of U.S. patent application Ser. No. 16/118,317, filed Aug. 30, 2018 (now U.S. Pat. No. 11,029,837), which are hereby incorporated by reference in their entireties.

BACKGROUND

Self-driving vehicles are becoming pervasive in society, yet there is still apprehension about safety aspects of this technology. Society remains wary about whether the technology within self-driving vehicles can account for every possible situation. As such, self-driving vehicles are increasingly using additional sensors to monitor the environment outside of the vehicle to detect potential obstacles. For example, conventional self-driving vehicles may use proprioceptive sensors (responsible for sensing of vehicle's state like wheel encoders, inertial measurement unit, etc.) or exteroceptive sensors (responsible for sensing the ambient surrounding like cameras, LiDAR, RADARs, ultrasonic, etc.) in order to detect obstacles and/or prevent accidents. Despite these additional sensors and despite improvements to electronic decision making, the guidance systems of self-driving vehicles are still not able to detect all potential hazards for accident prevention.

SUMMARY

Accordingly, systems and methods are disclosed herein for an improved guidance system for self-driving vehicles. For example, the guidance system described herein provides an improvement in accident prevention by altering user interfaces of self-driving vehicles based on movements of passengers in the self-driving vehicles. That is, while conventional self-driving vehicle systems increasing rely on newer and additional sensor technology monitoring the vehicle itself and/or the environment around the vehicle, the guidance system disclosed herein improves safety by monitoring passengers within the vehicle. In particular, the guidance system improves safety by monitoring passengers for movements or actions that indicate impending accidents or hazardous conditions. As an illustrative example, a passenger in a self-driving car may instinctively grab the steering wheel (even though the vehicle is self-driving) if the passenger believes an accident is imminent. By monitoring for such actions, the guidance system reduces its reliance on sensors monitoring the vehicle itself and/or the environment around the vehicle. Instead of relying solely on the automated systems, the guidance system supplements and enhances its self-driving capabilities by relying on a passenger to detect potential hazards.

To achieve the aforementioned results, the guidance system described herein utilizes recent advances in wearable technologies to monitor for and detect the actions of the passenger that are indicative of a potential accident or hazard. Specifically, the guidance system application may monitor for the movements of wearable devices (e.g., located on the wrist of a user) and use the movements of these wearable devices to detect actions (e.g., grabbing the steering wheel) of the users. Furthermore, the guidance system application is configured to use and provide novel functionality for wearable devices by tracking wearable device movement in relation to a reference point (e.g., the steering wheel) within the vehicle. When the guidance system application detects movement of the wearable device in relation to the reference point within the vehicle, the guidance system application may trigger a response that improves accident prevention. By using a reference point within the vehicle as well as setting thresholds necessary to trigger responses, the guidance system application may reduce false positives and thereby increase overall safety.

Specifically, the guidance system application may generate for display media content on a user interface for a self-driving vehicle. The guidance system application may detect a wearable user device within the self-driving vehicle. The guidance system application may detect a movement from the wearable user device. The guidance system application may compute a value of the movement from the wearable user device. The guidance system application may retrieve a threshold value. The threshold value indicates a maximum value at which the self-driving vehicle removes the media content on the user interface. The guidance system application may determine whether the value of the movement from the wearable user device exceeds the threshold value. The guidance system application may, in response to determining the value of the movement from the wearable user device exceeds the threshold value, remove the media content on the user interface for the self-driving vehicle.

As an example, while the guidance system application may receive a selection of a particular media, The Matrix, from the user and generate for display the media on the inside of the windshield of a self-driving vehicle. The user is wearing a smartwatch on his left arm and assumes a relaxed posture while the media is playing. At some duration during the journey, the user suddenly detects an anomaly as he sees some precipitation fall from the sky out of his passenger side window. The user is particularly cautious about precipitation and immediately and quickly assumes the standard driving position which his left arm quickly grabs the steering wheel. The guidance system application detects a movement from the smartwatch of the user. The guidance system application then computes the value of the movement from the wearable user device. In this situation the guidance system application computes that the arm accelerated at 9 m/s$^2$. The guidance system application may then retrieve a threshold value of 8 m/s$^2$, and determines whether the smartwatch movement is greater than the threshold value. As the arm (e.g., smartwatch) movement is greater than the threshold value, the guidance system application removes the media content from the front windshield to provide enhanced visibility to the user.

The guidance system application may perform the following actions to enable altering user interfaces of self-driving vehicles based on movements of passengers in the self-driving vehicles. The guidance system application, operated by user equipment, may generate for display media content on a user interface for a self-driving vehicle. For example, a user may elect to watch The Matrix while the vehicle is operating in self-driving mode during a long journey, where the guidance system application would receive selection of The Matrix from the user and generate for display the movie on the inside of the windshield of the self-driving vehicle. By generating for display media content on a user interface, the guidance system application may now perform various functions in order to alter the user interface based on movements of passengers.

The guidance system application may detect a wearable user device within the self-driving vehicle. For example, a user may be wearing a smartwatch while being within the self-driving vehicle. By the guidance system application detecting a wearable device on a user within a self-driving vehicle, the guidance system application determines that it may monitor the actions of the passenger within the vehicle.

The guidance system application may detect movement from the wearable user device. For example, a user quickly moves his left arm (the left arm harnessing the smartwatch) and quickly grabs the steering wheel. This may be detected by the guidance system application, which receives acceleration data from the smartwatch between multiple reference positions. By the guidance system application detecting a movement from the wearable user device, the system is able to detect actions of the passenger indicative of hazardous conditions.

The guidance system application may compute a value of the movement from the wearable user device. For example, the guidance system application may compute the value of the movement from the wearable user device by parsing the detected movement into a standardized measurement. For instance, in this situation the guidance system application may receive the movement data and compute that the arm accelerated at 9 $m/s^2$. By the guidance system application computing the value of the movement from the wearable user device, the guidance system application is able to precisely detect and categorize the movements of the user.

The guidance system application may retrieve a threshold value. The threshold value may indicate a maximum value at which the self-driving vehicle removes the media content on the user interface. For example, the guidance system application may retrieve a threshold value from a database of 8 $m/s^2$. By using threshold values, the guidance system application may distinguish user movements that should trigger accident prevention responses and incidental movements that should not trigger accident prevention responses.

The guidance system application may determine whether the value of the movement from the wearable user device exceeds the threshold value. For example, the guidance system application may compare whether the movement from the user's smartwatch (e.g., 9.8 $m/s^2$) exceeds the threshold value retrieved from a database (e.g., 8 $m/s^2$). By the guidance system application determining if the computed value of the user's smartwatch exceeds a threshold value, the guidance system application can reduce false positives and determine to alter user interfaces of self-driving vehicles based only on movements of passengers that exceed the threshold.

The guidance system application may determine, in response to determining the value of the movement from the wearable user device exceeds the threshold value, to remove the media content on the user interface for the self-driving vehicle. For example, with the smartwatch movement is greater than the threshold value, the guidance system application removes the playing of The Matrix from the front windshield to provide enhanced visibility to the user. By the guidance system application removing media content on the user interface in response to a determination that the value of the movement exceeds a threshold value, the guidance system application may allow the user to more clearly view road conditions, resume control of the self-driving vehicle, and/or avoid an accident.

In some embodiments, the guidance system application may, when computing the value of the movement from the wearable user device, monitor an acceleration rate of the wearable user device and a first position of the wearable user device relative to a reference position within the self-driving vehicle. The first position may be outside a threshold proximity to the reference position. For example, the reference point may be the steering wheel of the self-driving vehicle and the user is assuming a casual posture where the smartwatch is outside a threshold proximity of the steering wheel. By the guidance system application determining the acceleration rate of the wearable user device relative to a reference position within the self-driving vehicle, the guidance system application receives additional information required to distinguish the movements of the passenger and detect actions that should trigger accident prevention responses.

In some embodiments, the guidance system application may, in response to determining that the monitored acceleration rate exceeds a threshold rate, determine a second position of the wearable user device relative to the reference position. For example, if the user is startled and from the casual position with his arm bearing the wrist watch accelerates quickly towards the steering wheel, the guidance system application determines a second position of the smartwatch relative to the steering wheel, which is closer to the reference point. By the guidance system application determining the acceleration rate of the wearable user device relative to a second reference position within the self-driving vehicle, the guidance system application receives additional information required to distinguish the movements of the passenger and detect actions that should trigger accident prevention responses.

In some embodiments, the guidance system application may, determining whether the second position is within the threshold proximity. For example, if the second position of the smartwatch relative to the steering wheel which is must closer to the steering wheel, the system performs a calculation of whether the smartwatch is now within a threshold proximity of the steering wheel. By the guidance system application determining whether the second reference position is within a threshold proximity, the guidance system application receives additional information required to make a determination of whether to alter user interfaces of self-driving vehicles based on movements of passengers.

In some embodiments, the guidance system application may, in response to determining that the second position is within the threshold proximity, determine the movement from the wearable user device as the value of the movement. For example, the guidance system application will use the acceleration measurements at the second reference point, within threshold proximity of the steering wheel, and use this information as the value of the movement. By guidance system application determining a quantitative measure of the value of the movement, the system can determine whether the value of the movement exceeds the threshold value of whether to remove the media content on the user interface for the self-driving vehicle.

In some embodiments, the guidance system application may, when generating for display media content on the user interface for the self-driving vehicle, determine whether the self-driving vehicle is operating in a self-driving operating mode. For example, the user of the self-driving vehicle may engage self-driving operating mode and assume a relaxed posture. By the guidance system application determining that the self-driving vehicle is operating in a self-driving mode, the guidance system application may implement embodiments to generate for display media content on a user interface for the self-driving vehicle.

In some embodiments, the guidance system application may, in response to determining that the self-driving vehicle is operating in the self-driving operating mode, generate for display media content on the user interface for the self-driving vehicle. For example, the user assuming a relaxed posture as the self-driving vehicle is in self-driving operating mode may select to watch The Matrix to be displayed on the front windshield of the self-driving vehicle. By guidance system application generating for display media content on the user interface, the system may alter user interfaces of self-driving vehicles based on movements of passengers in the self-driving vehicles.

In some embodiments, the guidance system application may, when generating for display media content on the user interface for the self-driving vehicle, retrieve user metadata of a user from a database based on a user profile. For example, the user of the self-driving vehicle may engage self-driving operating mode and assume a relaxed posture. The guidance system application may retrieve metadata relating to the user relating to a variety of user specific information, including the user's preferences for media content. By guidance system application retrieving metadata of a user, the system may implement user specific media content on a user interface for the self-driving vehicle.

In some embodiments, the guidance system application may determine a user specific media content asset based on the retrieved user metadata. For example, the retrieved metadata may determine that the user was watching The Matrix just before his trip using the self-driving vehicle and determines to continue to play the same media content based on this user metadata as a default playback. By the guidance system application determining user specific media content, the guidance system application may implement user specific media content on a user interface for the self-driving vehicle.

In some embodiments, the guidance system application may, when retrieving user metadata of the user from the database based on the user profile, obtain a user identifier of the self-driving vehicle. For example, the system may retrieve a user identifier of the user from a digital key which is used for entry to the self-driving vehicle. By the guidance system application obtaining a user identifier of the self-driving vehicle, the system may implement user specific media content on a user interface for the self-driving vehicle.

In some embodiments, the guidance system application may match the user identifier to the user profile. For example, the system may determine the user identifier matches a user profile from a database. The database may provide metadata of the user profile such as media content preferences. By the guidance system application obtaining a user identifier of the self-driving vehicle, the guidance system application may implement user specific media content on a user interface for the self-driving vehicle.

In some embodiments, the guidance system application may retrieve user metadata of the user from the database based on the user profile. For example, the system may retrieve user specific media content preferences from the database such as the user prefers The Matrix as their top selection for movies. By the guidance system application retrieving user specific metadata of the user of the self-driving vehicle, the guidance system application may implement user specific media content on a user interface for the self-driving vehicle.

In some embodiments, the guidance system application may, when, in response to determining the value of the movement from the wearable user device does not exceed the threshold value, determine whether the value of the movement falls within the limits of a second threshold proximity. For example, the user who has assumed a casual posture may move his arms (including the smartwatch) at a rate which is less than the threshold value. This may be because the user does not sense an emergency but rather wishes to augment the media content display and/or playback. By the guidance system application determining whether the value of the movement falls within the limits of a second threshold proximity vehicle, the guidance system application may implement variations of the user interface for the self-driving vehicle.

In some embodiments, the guidance system application may, in response to determining that the value of the movement falls within the limits of the second threshold proximity, alter the media content on the user interface for the self-driving vehicle. For example, the guidance system application may display standard video controls of the media content. The guidance system application may alter the media content on the user interface for the self-driving vehicle, the system may alter the user interface of the self-driving vehicle based on movements of the user.

In some embodiments, the guidance system application may, when altering the media content on the user interface for the self-driving vehicle, alter the user interface, from a first user interface to a second user interface, wherein the second user interface comprises a translucent user interface. For example, the user who grabs the steering wheel by not exceeding the threshold value, may wish to have visibility of the road ahead but also simultaneously watch the current media. In some embodiments, the display for the media playback will alter to a user interface which is translucent which allows for visibility of the road ahead. This may be because the user does not sense an emergency but rather wishes to augment the media content display and/or playback. The guidance system application determining whether to alter the user interface, from a first user interface to a second user interface, the system may alter user interfaces of self-driving vehicles based on movements of passengers in the self-driving vehicles in various degrees more than active and removed.

In some embodiments, the guidance system application may detect a second movement from the wearable user device within a third threshold proximity. For example, the user may revert his arms back to assuming a relaxed posture where both arms are away from the reference point (e.g., steering wheel). The guidance system application detecting a second movement from the wearable user device within a third threshold proximity, the system may further alter the user interface of the self-driving vehicle based on movements of the user.

In some embodiments, the guidance system application may, in response to detecting the second movement from the wearable user device within the third threshold proximity, revert the user interface from the second user interface to the first user interface. For example, after the user assumes the relaxed posture, the guidance system application will revert the user interface to playing The Matrix with no translucence in the display. The guidance system application detecting a second movement from the wearable user device within a third threshold proximity, the system may further alter the user interface of the self-driving vehicle based on movements of the user.

In some embodiments, the guidance system application may, when retrieving a threshold value, wherein the threshold value indicates a maximum value at which the self-driving vehicle changes from the first mode to the second mode, retrieve the current speed of the self-driving vehicle.

For example, if the user is travelling at a high rate of speed such as 80 mph in the self-driving vehicle, the guidance system application would retrieve the rate of speed from the self-driving vehicle. The guidance system application may determine whether to retrieve the current speed of the self-driving vehicle, the system receives information to determine a threshold value to measure movements of passengers in the self-driving vehicles with increased accuracy.

In some embodiments, the guidance system application may determine the threshold value based on the current speed of the self-driving vehicle, wherein the threshold value varies with speed of the self-driving vehicle. For example, if the user is travelling at a high rate of speed such as 80 mph in the self-driving vehicle, the retrieved threshold value may scale by a factor relative to the current speed. The guidance system application determines whether to retrieve the current speed of the self-driving vehicle, the system receives information to determine a threshold value to measure movements of passengers in the self-driving vehicles with increased accuracy.

In some embodiments, the guidance system application may, when retrieving a threshold value, wherein the threshold value indicates a maximum value at which the self-driving vehicle changes from the first mode to the second mode, retrieve user metadata of a user from a database based on a user profile, wherein the retrieved user metadata includes historical driving based metadata of the user. For example, if the user is travelling at a high rate of speed such as 80 mph in the self-driving vehicle, the guidance system application would retrieve the user metadata (e.g., based on the user identifier). In some embodiments, the metadata may relate the user's driving history. The guidance system application may retrieve user metadata of a user from a database based on a user profile. In particular, the guidance system application may receive information to determine a threshold value to measure movements of passengers in the self-driving vehicles with increased accuracy.

In some embodiments, the guidance system application may determine the threshold value based on the historical driving based metadata of the user. For example, if the user routinely drives at 80 mph and there have been no instances of any alterations to the user interface in the last 2 months at this speed, the threshold value may be scaled by a certain factor. The guidance system application may retrieve user metadata of a user from a database based on a user profile. In particular, the guidance system application may receive information to determine a threshold value to measure movements of passengers in the self-driving vehicles with increased accuracy.

In some embodiments, the guidance system application may, when retrieving a threshold value, wherein the threshold value indicates a maximum value at which the self-driving vehicle changes from the first mode to the second mode, retrieve the current location of the self-driving vehicle. For example, if the user is travelling through Long Beach California, the guidance system application may retrieve the current location. By an guidance system application retrieving the current location of the self-driving vehicle, the system receives information to determine a threshold value to measure movements of passengers in the self-driving vehicles with increased accuracy.

In some embodiments, the guidance system application may determine the threshold value based on the current location of the self-driving vehicle, wherein the threshold value varies with location of the self-driving vehicle. For example, if the user is travelling through Long Beach California, the guidance system application may retrieve the current location. Furthermore, the guidance system application may retrieve information of the location of the location from a database which may indicate that Long Beach has a high degree of reported incidences of traffic irregularities, road artifacts, and/or pedestrian traffic. Using this retrieved locational information, the guidance system application may scale the threshold value with the location of the self-driving vehicle. By the guidance system application retrieving the current location, and information related to the location, of the self-driving vehicle, the guidance system application may receive information to determine a threshold value to measure movements of passengers in the self-driving vehicles with increased accuracy.

In some embodiments, the guidance system application prevents accidents by altering user interfaces of self-driving vehicles based on movements of passengers in the self-driving vehicles. The guidance system application may play a multimedia device in first mode when a vehicle is running in auto-pilot mode. The guidance system application may detect intent of a user to take manual control of the vehicle. In some embodiments, the guidance system application may detect intent using motion sensors within the self-driving vehicle cabin. In some embodiments, the guidance system application may detect intent using a combination of various sensors (e.g., motion, infrared, radar, signal strength, etc.) with predictive analytics stored in a database for the specific user of the self-driving vehicle. The guidance system application may, in response to the detecting the intent of the user, play the multimedia device in second mode when the vehicle is about to enter in to the manual-control mode. In some embodiments, the second mode may include adjusting the audio from a first volume level to a second volume level.

It should also be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
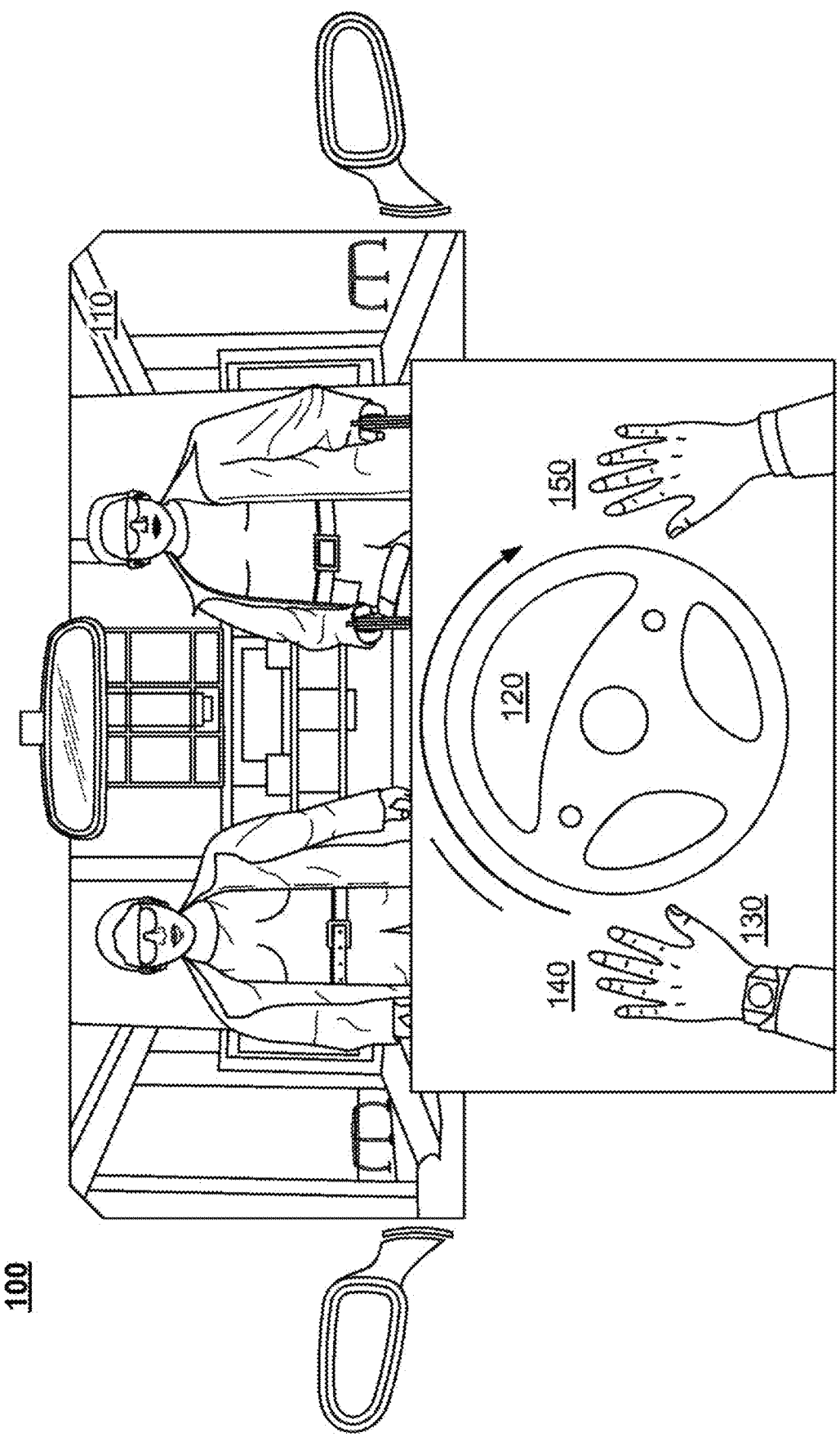
FIG. 1 shows an illustrative embodiment of a user interface of a self-driving vehicle displaying media content.

Systems and methods are described herein for assisting switch to manual mode in self-driving vehicles in cases of perceived emergency. In some embodiments, the guidance system application may perform the following actions to enable altering user interfaces of self-driving vehicles based on movements of passengers in the self-driving vehicles. The guidance system application, operated by user equipment, may generate for display media content on a user interface for a self-driving vehicle. For example, a user may elect to watch The Matrix while the vehicle is operating in self-driving mode during a long journey, where the guidance system application would receive selection of The Matrix from the user and generate for display the movie on the inside of the windshield of the self-driving vehicle. By generating for display media content on a user interface, the guidance system application may now perform various functions in order to alter the user interface based on movements of passengers. In some embodiments, a self-driving vehicle may be any vehicle that can guide itself without human intervention. In some embodiments, the self-driving vehicle may be a automobile, bus, truck, boat, bicycle, motorcycle, scooter, all-terrain vehicle, train, autobus, drone, airplane, helicopter, and similar type vehicles. In some embodiments, media content may be any type of video, audio, pictorial, document, or other format for consumption by a user in a self-driving vehicle. For example, media content may include movies (e.g., video) and/or emails (e.g., electronic document). FIG. 1 shows an illustrative embodiment 100 of a user interface of a self-driving vehicle displaying media content. The guidance system application within the self-driving vehicle has generated for display The Matrix on the inside of the windshield 110. The user of the self-driving vehicle currently has both hands (e.g., 140 and 150) off the steering wheel 120. The guidance system application detects the user is wearing a wearable user device 130, namely a smart watch. In some embodiments, a wearable user device is any electronic device of a user which can be affixed to the user. For example, wearable user device may include smart watch, electronic music player mounted to the user, mobile phone mounted to the user, electronic devices used for fitness equipment, augmented/virtual reality eyewear, smart clothing, smart personal accessories, and similar electronic user devices. In some embodiments, the guidance system application may retrieve various media content from the user equipment itself where the media is stored in storage local to the self-driving vehicle. In some embodiments, the guidance system application may retrieve various media content from a media content source which is connected via a communication network (e.g., cellular data network, satellite network, wireless connection, and similar types of connective networks) which interfaces with the user equipment. In some embodiments, the guidance system application retrieves media content from a portable electronic device within a proximity of the self-driving vehicle; for example, the guidance system application may be able to interface with a passenger's mobile phone in order to generate for display media content on the inside of the windshield. In some embodiments, the guidance system application may generate for display within a designated screen within the self-driving vehicle (e.g., UI display within the dashboard of the self-driving vehicle). In yet other embodiments, the guidance system application may generate for display media content on the inside of the windshield. In yet other embodiments, the guidance system application may generate for display media content on one or more display devices, within close proximity of the self-driving vehicle, connected with the user equipment.

The guidance system application may detect a wearable user device within the self-driving vehicle. For example, a user may be wearing a smartwatch while being within the self-driving vehicle. By the guidance system application detecting a wearable device on a user within a self-driving vehicle, the guidance system application is able to alter user interfaces based on movements detected within the wearable device of the user. In some embodiments, the wearable device on the user may be a fixed electronic device to one of the user's limbs (e.g., portable music player affixed to user's wrist for athletic activity). In some embodiments, the wearable device on the user may include smart clothing with receptors on the arm portion of the clothing.

Figure 2:
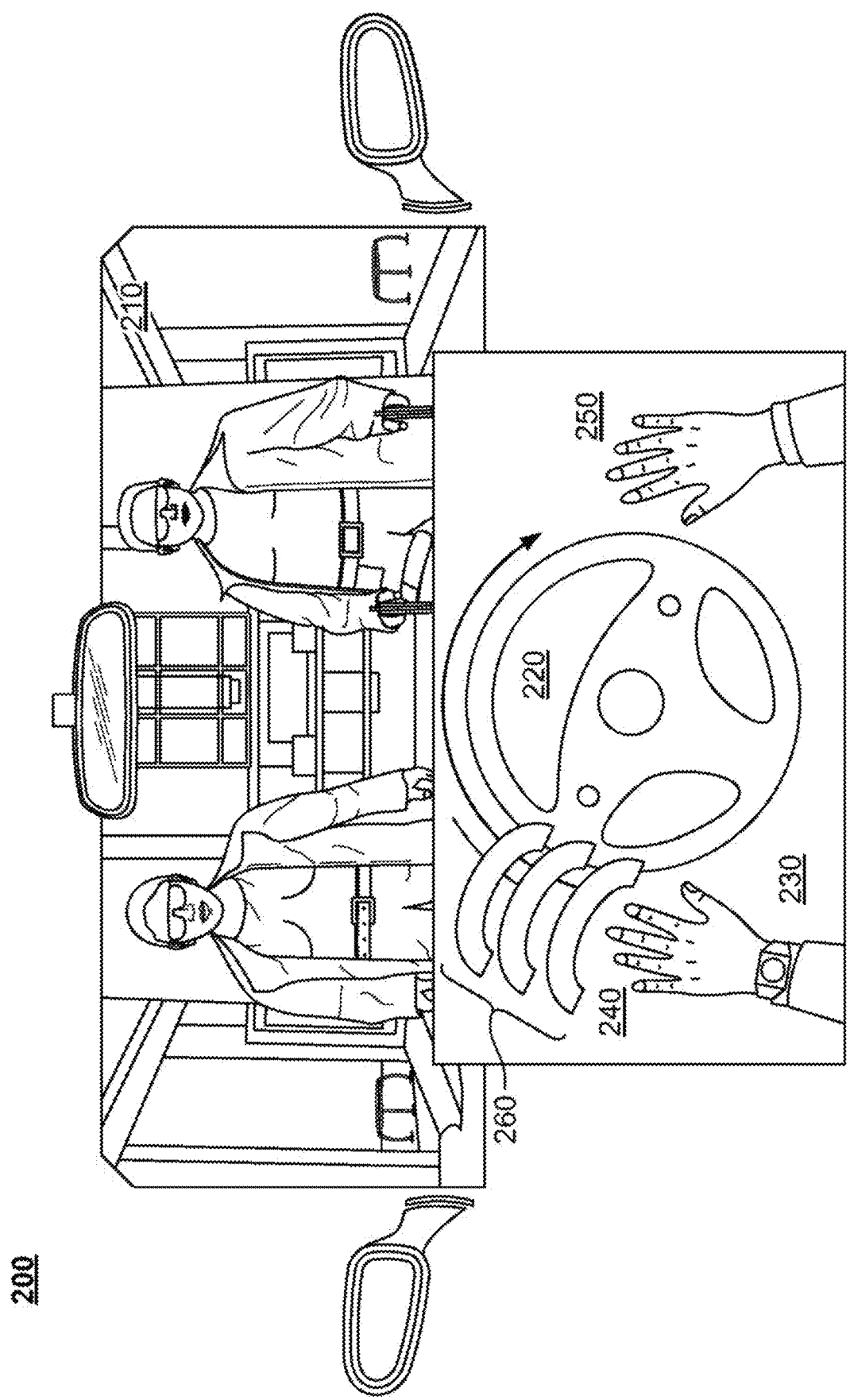
FIG. 2 shows an illustrative embodiment of a user interface of a self-driving vehicle displaying media content where the movement from the wearable user device exceeds a threshold value.

The guidance system application may detect movement from the wearable user device. For example, a user quickly moves his left arm (the left arm harnessing the smartwatch) and quickly grabs the steering wheel. This may be detected by the guidance system application which receives acceleration data from the smartwatch between multiple reference positions. By the guidance system application detecting a movement from the wearable user device, the guidance system application is able to alter user interfaces based on the detected movement. FIG. 2 shows an illustrative embodiment 200 of a user interface 210 of a self-driving vehicle displaying media content where the movement 260 from the wearable user device exceeds a threshold value. In some embodiments, the guidance system application preconfigures the threshold value to a suitable value based on a variety of factors (e.g., the type of self-driving vehicle and user wearable device). In some embodiments, the guidance system application retrieves information from a combination of at least one of the journey taken by the self-driving vehicle and the user wearable device to determine the threshold value. The left hand of the user 240, harnessing the smart watch on its wrist 230, as well as the right hand 250 move rapidly towards the steering wheel 220 upon the user detecting a perceived emergency. In some embodiments, the guidance system application detects movements using accelerators within the wearable device. In some embodiments, the position to a reference point may be determined by signal strength of the wearable device to a receiver within the self-driving vehicle. For example, the guidance system application may determine the position of a smartwatch, which is connected via Bluetooth to the self-driving vehicle. The guidance system application may determine the position by measuring the signal strength against a Bluetooth transceiver built into the steering wheel (or alternatively into the dashboard). If the user is resting in a relaxed posture, then the guidance system application determines that the smartwatch farther from the steering wheel and the signal strength is lower. If the user's hands are on the wheel, then the guidance system application determines that the smartwatch's Bluetooth signal strength would be stronger as the smartwatch is beside the Bluetooth transceiver.

The guidance system application may compute a value of the movement from the wearable user device. For example, the guidance system application may compute the value of the movement from the wearable user device by parsing the detected movement into a standardized measurement. For instance, in this situation the guidance system application may receive the movement data and compute that the arm accelerated at 9 m/s$^2$. By the guidance system application computing the value of the movement from the wearable user device, the guidance system application is able to use the value to determine whether to alter user interfaces based on the detected movement.

The guidance system application may retrieve a threshold value. The threshold value may indicate a maximum value at which the self-driving vehicle removes the media content on the user interface. For example, the guidance system application may retrieve a threshold value from a database of 8 m/s$^2$. By the guidance system application retrieving a threshold value, the guidance system application receives necessary information required for a comparison between the computed value of the movement and the threshold value.

The guidance system application may determine whether the value of the movement from the wearable user device exceeds the threshold value. For example, the guidance system application may compare whether the movement from the user's smartwatch (e.g., 9.8 m/s$^2$) exceeds the threshold value retrieved from a database (e.g., 8 m/s$^2$). By the guidance system application determining if the computed value of the user's smartwatch exceeds a threshold value, the guidance system application can determine whether to alter user interfaces of self-driving vehicles based on movements of passengers.

Figure 3:
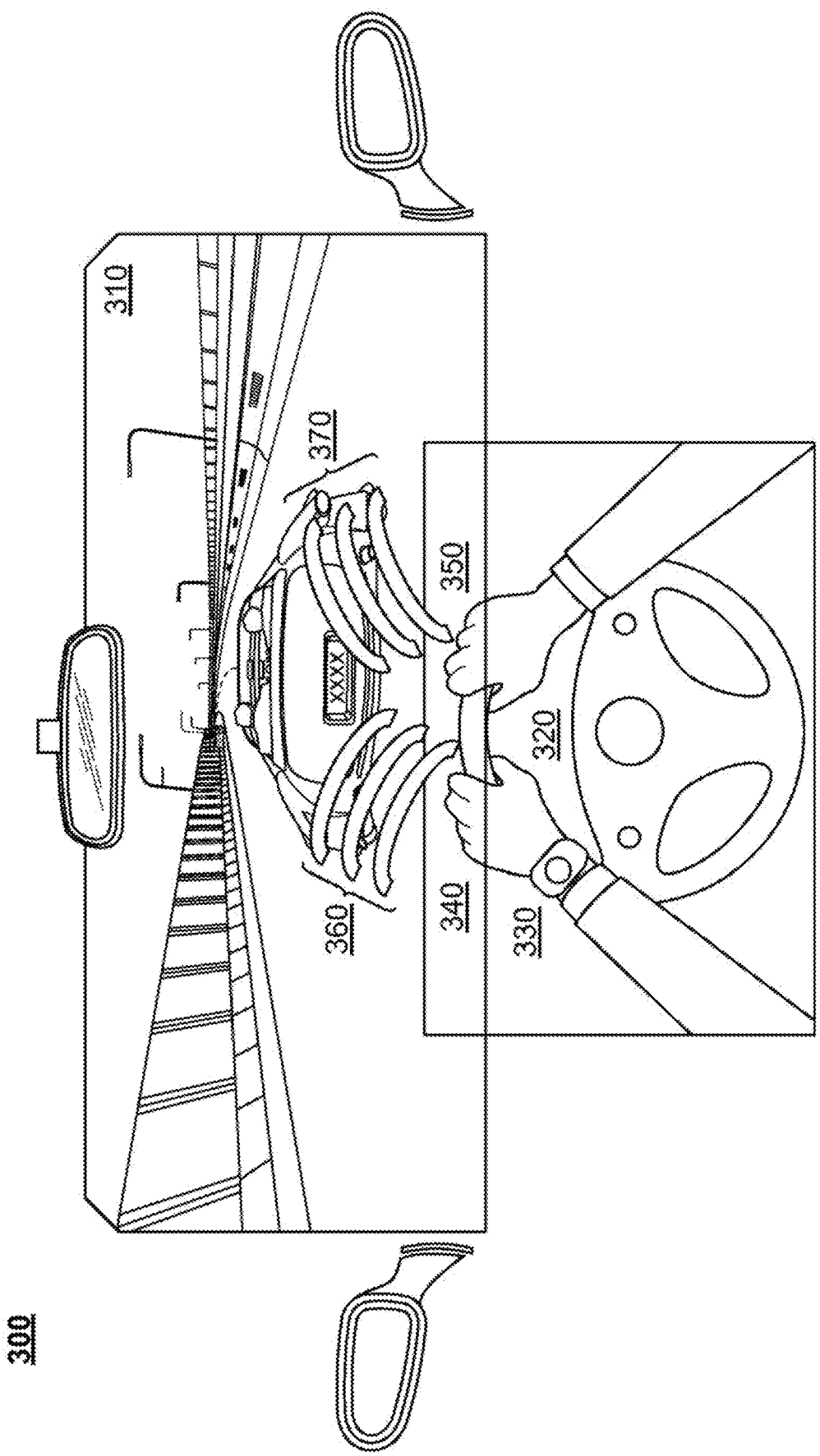
FIG. 3 shows an illustrative embodiment of the user interface of a self-driving vehicle having removed the media content from display where the movement from the wearable user device exceeds a threshold value.

The guidance system application may determine, in response to determining the value of the movement from the wearable user device exceeds the threshold value, to remove the media content on the user interface for the self-driving vehicle. For example, with the smartwatch movement is greater than the threshold value, the guidance system application removes the playing of The Matrix from the front windshield to provide enhanced visibility to the user. By the guidance system application removing media content on the user interface in response to a determination that the value of the movement exceeds a threshold value, the guidance system application may alter user interfaces of self-driving vehicles based on movements of passengers. FIG. 3 shows an illustrative embodiment 300 of the user interface 310 of a self-driving vehicle having removed the media content from display, where the movement 360 from the wearable user device 330 exceeds a threshold value. The user of the self-driving vehicle moved both hands (e.g., 340 and 350) very quickly (e.g., 360 and 370) to hold the steering wheel 320. In this situation, the guidance system application removes The Matrix from being displayed on the inside windshield; and instead, the guidance system application provides for the windshield to resume in normal transparent appearance allowing for the user of the self-driving vehicle to view the road ahead and take control of the self-driving vehicle accordingly.

In some embodiments, the guidance system application may, when computing the value of the movement from the wearable user device, monitor an acceleration rate of the wearable user device and a first position of the wearable user device relative to a reference position within the self-driving vehicle. The first position may be outside a threshold proximity to the reference position. For example, the reference point may be the steering wheel of the self-driving vehicle and the user is assuming a casual posture where the smartwatch is outside a threshold proximity of the steering wheel. By the guidance system application determining the acceleration rate of the wearable user device relative to a reference position within the self-driving vehicle, the guidance system application receives information required to make a determination of whether to alter user interfaces of self-driving vehicles based on movements of passengers. In some embodiments, multiple reference positions may be used to determine whether a monitored acceleration rate exceeds a threshold rate. In some embodiments, the reference position may be the steering wheel of the self-driving vehicle. In some embodiments, the guidance system application may receive input from the user to configure the reference position. In some embodiments, the reference position may be a particular spatial point within the self-driving vehicle and need not be physically tied to a part of the self-driving vehicle (e.g., reference point need not be tied to the steering wheel).

In some embodiments, the guidance system application may, in response to determining that the monitored acceleration rate exceeds a threshold rate, determine a second position of the wearable user device relative to the reference position. For example, if the user is startled and from the casual position with his arm bearing the wrist watch accelerates quickly towards the steering wheel, the guidance system application determines a second position of the smartwatch relative to the steering wheel which is must closer to the reference point. By the guidance system application determining the acceleration rate of the wearable user device relative to a second reference position within the self-driving vehicle, the guidance system application receives additional information required to make a determination of whether to alter user interfaces of self-driving vehicles based on movements of passengers.

In some embodiments, the guidance system application may, determining whether the second position is within the threshold proximity. For example, if the second position of the smartwatch relative to the steering wheel which is must closer to the steering wheel, the system performs a calculation of whether the smartwatch is now within a threshold proximity of the steering wheel. By the guidance system application determining whether the second reference position is within a threshold proximity, the guidance system application receives additional information required to make a determination of whether to alter user interfaces of self-driving vehicles based on movements of passengers. In some embodiments, the threshold proximity is a pre-configured value known to the user equipment. In some embodiments, the guidance system application iteratively adjusts the threshold proximity based on previous instances where the user (e.g., identified by the same wearable user device) has exceeded the threshold proximity. In some embodiments, the guidance system application iteratively adjusts threshold proximity based on aggregate user data stored at a remote database.

In some embodiments, the guidance system application may, in response to determining that the second position is within the threshold proximity, determine the movement from the wearable user device as the value of the movement. For example, the guidance system application will use the acceleration measurements at the second reference point, within threshold proximity of the steering wheel, and use this information as the value of the movement. By the guidance system application determining a quantitative measure of the value of the movement, the guidance system application can determine whether the value of the movement exceeds the threshold value of whether to remove the media content on the user interface for the self-driving vehicle.

In some embodiments, the media guidance application may, when generating for display media content on the user interface for the self-driving vehicle, determine whether the self-driving vehicle is operating in a self-driving operating mode. For example, the user of the self-driving vehicle may engage self-driving operating mode and assume a relaxed posture. By the media guidance application determining that the self-driving vehicle is operating in a self-driving mode, the media guidance application may implement embodiments to generate for display media content on a user interface for the self-driving vehicle. In some embodiments, the media guidance application may receive the current mode of the self-driving vehicle from the user equipment. In some embodiments, the self-driving operating mode may be any degree of autonomous driving performed by the self-driving vehicle. For example, in one embodiment, the self-driving operating mode may include gap control between vehicles.

In some embodiments, the media guidance application may, in response to determining that the self-driving vehicle is operating in the self-driving operating mode, generate for display media content on the user interface for the self-driving vehicle. For example, the user assuming a relaxed posture as the self-driving vehicle is in self-driving operating mode may select to watch The Matrix to be displayed on the front windshield of the self-driving vehicle. By the media guidance application generating for display media content on the user interface, the media guidance application may alter user interfaces of self-driving vehicles based on movements of passengers in the self-driving vehicles.

In some embodiments, the media guidance application may, when generating for display media content on the user interface for the self-driving vehicle, retrieve user metadata of a user from a database based on a user profile. For example, the user of the self-driving vehicle may engage self-driving operating mode and assume a relaxed posture. The media guidance application may retrieve metadata relating to the user relating to a variety of user specific information, including the user's preferences for media content. By the media guidance application retrieving metadata of a user, the system may implement user specific media content on a user interface for the self-driving vehicle. In some embodiments, the media guidance application may generate for display specific media content in the self-driving vehicle which was being generated for display on another one of the user's user electronic devices if both the generation for display on one of the user's electronic devices and the generation for display in the self-driving vehicle are within a predetermined time proximity. For example, if a user is watching sports highlights in his kitchen before going to work in the morning and leaves to get into his self-driving vehicle, the guidance system application in the self-driving vehicle will continue to play the same media content (e.g. sports highlights) the user was watching inside his house in the self-driving vehicle. The media guidance application may retrieve information from a remote media content source regarding previously watched media content of the user. In some embodiments, the user profile may be generated by the guidance system application. In some embodiments, the guidance system application may retrieve the user profile from a third party database using the communication network. In some embodiments, the user profile may include user specific media content asset. In some embodiments, the guidance system application may retrieve the user specific metadata.

In some embodiments, the media guidance application may determine a user specific media content asset based on the retrieved user metadata. For example, the retrieved metadata may determine that the user was watching The Matrix just before his trip using the self-driving vehicle and determines to continue to play the same media content based on this user metadata as a default playback. By the media guidance application determining user specific media content, the media guidance application may implement user specific media content on a user interface for the self-driving vehicle.

In some embodiments, the guidance system application may, when retrieving user metadata of the user from the database based on the user profile, obtain a user identifier of the self-driving vehicle. For example, the system may retrieve a user identifier of the user from a digital key which is used for entry to the self-driving vehicle. By the guidance system application obtaining a user identifier of the self-driving vehicle, the media guidance application may implement user specific media content on a user interface for the self-driving vehicle. In some embodiments, the user identifier may be the key to the self-driving vehicle, a mobile phone of the user of the self-driving vehicle, a biometric login of the user of the self-driving vehicle, or any other suitable authentication criteria used by the user of the self-driving vehicle.

In some embodiments, the media guidance application may match the user identifier to the user profile. For example, the system may determine the user identifier matches a user profile from a database. The database may provide metadata of the user profile such as media content preferences. By the media guidance application obtaining a user identifier of the self-driving vehicle, the media guidance application may implement user specific media content on a user interface for the self-driving vehicle. In some embodiments, the matching of the profile may include communicating with remote servers.

In some embodiments, the media guidance application may retrieve user metadata of the user from the database based on the user profile. For example, the media guidance application may retrieve user specific media content preferences from the database such as the user prefers The Matrix as their top selection for movies. By the media guidance application retrieving user specific metadata of the user of the self-driving vehicle, the media guidance application may implement user specific media content on a user interface for the self-driving vehicle.

Figure 4:
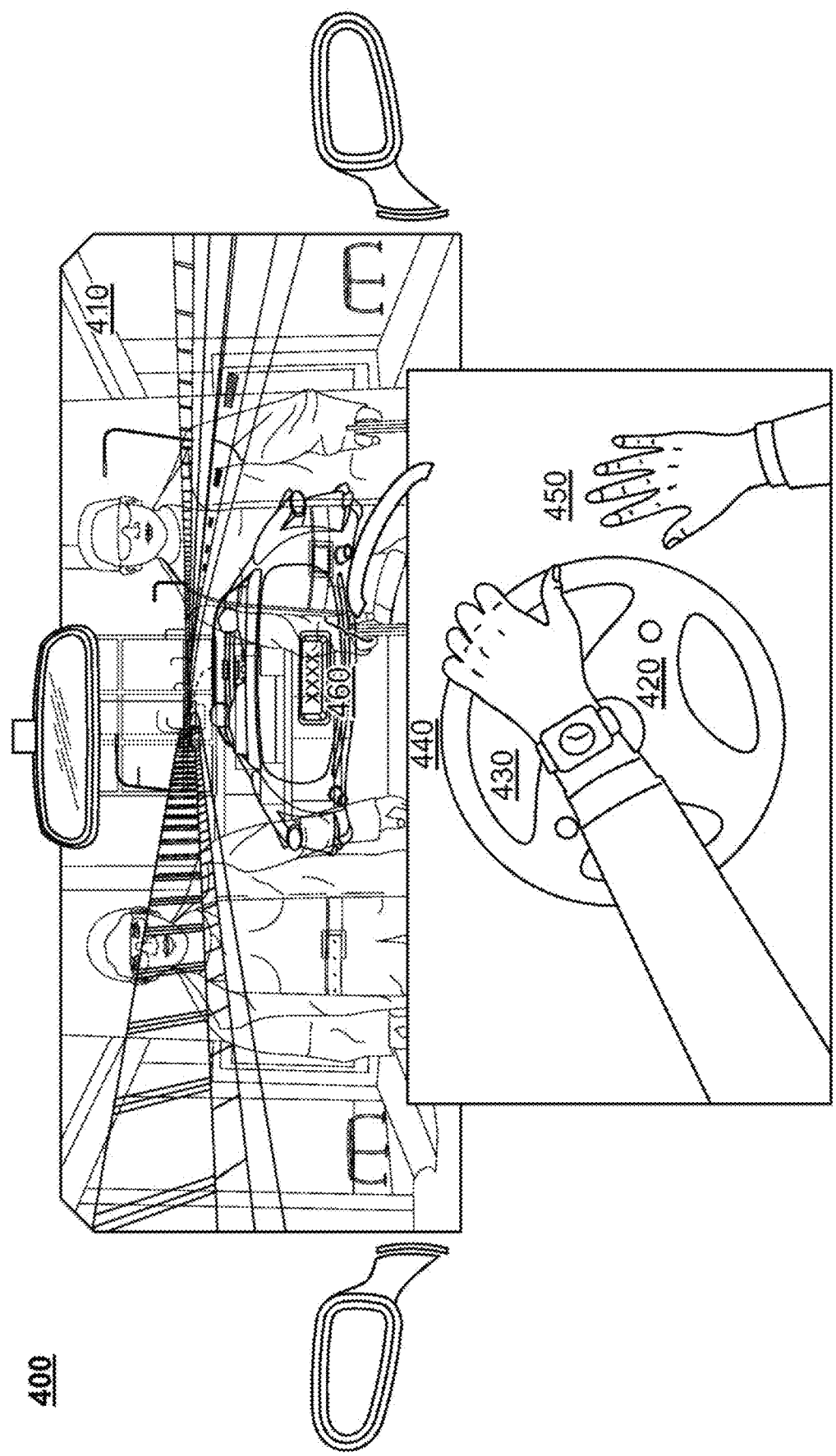
FIG. 4 shows a first illustrative embodiment of a modified user interface of a self-driving vehicle displaying media content where the movement from the wearable user device does not exceed a threshold value.
Figure 5:
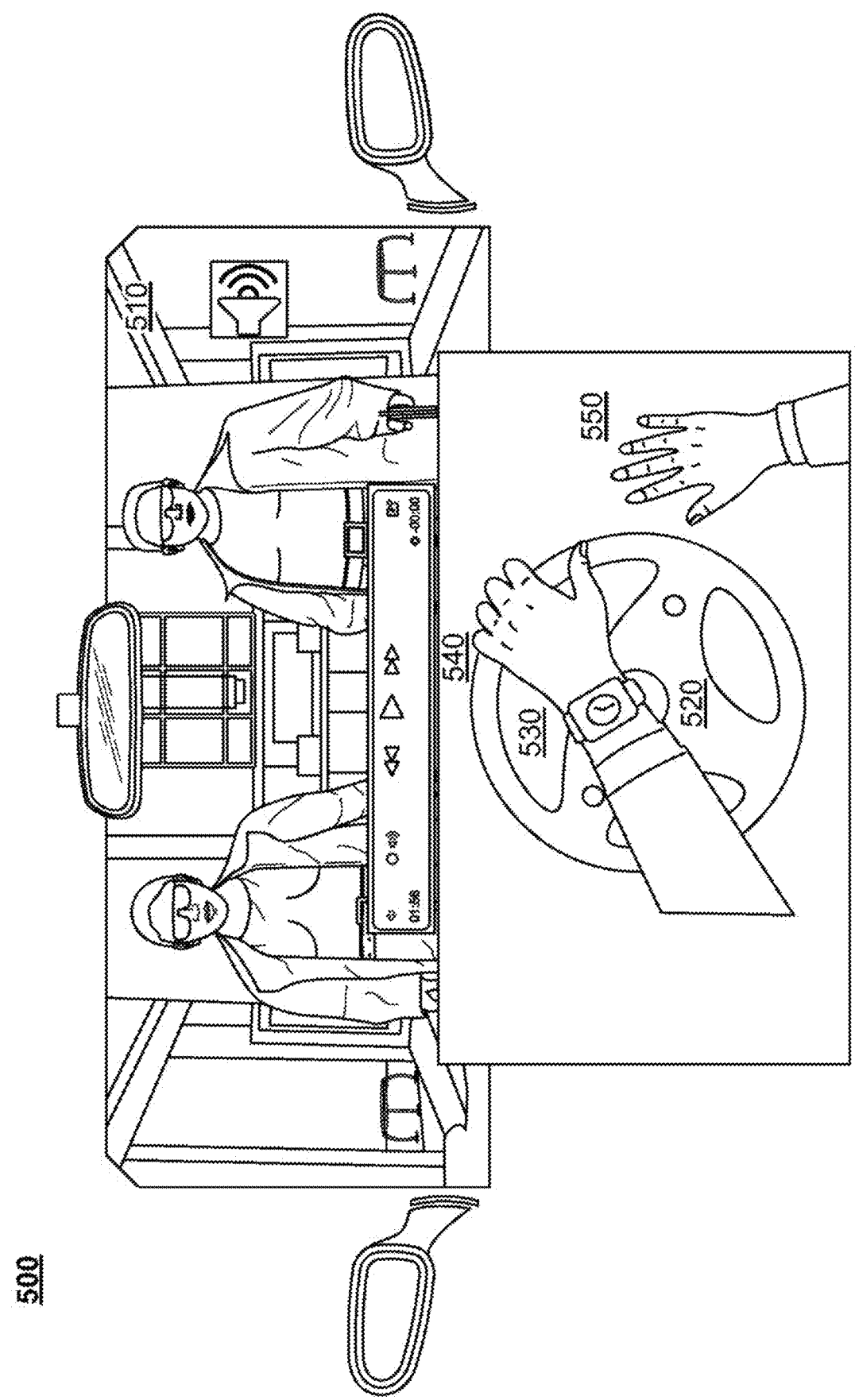
FIG. 5 shows a second illustrative embodiment of a modified user interface of a self-driving vehicle displaying media content where the movement from the wearable user device does not exceed a threshold value.

In some embodiments, the media guidance application may, when, in response to determining the value of the movement from the wearable user device does not exceed the threshold value, determine whether the value of the movement falls within the limits of a second threshold proximity. For example, the user who has assumed a casual posture may move his arms (including the smartwatch) at a rate which is less than the threshold value. This may be because the user does not sense an emergency but rather wishes to augment the media content display and/or playback. By the media guidance application determining whether the value of the movement falls within the limits of a second threshold proximity vehicle, the media guidance application may implement variations of the user interface for the self-driving vehicle. In some embodiments, the second threshold value is a pre-configured value known to the user equipment. In some embodiments, the guidance system application iteratively adjusts the second threshold value based on previous instances where the user (e.g., identified by the same wearable user device) has exceeded the threshold value. In some embodiments, the guidance system application iteratively adjusts second threshold value based on aggregate user data stored at a remote database. FIG. 5 shows an illustrative embodiment 500 of a modified user interface 510 of a self-driving vehicle displaying media content where the movement from the wearable user device 530 does not exceed a threshold value. The user of the self-driving vehicle has one hand 540 on the steering wheel 520 while the other hand 550 is casually relaxed. The example of the movement in FIG. 5 is even less than the movement detected in FIG. 4, and as such, the media guidance application may apply an altered user interface which provides media controls for The Matrix being generated for display on the windshield of the self-driving vehicle. In some embodiments, many other variations to the user interface are available based on the specific about of movement detected, where the movement is mapped to a specific type of user interface.

In some embodiments, the media guidance application may, in response to determining that the value of the movement falls within the limits of the second threshold proximity, alter the media content on the user interface for the self-driving vehicle. For example, the media guidance application may display standard video controls of the media content. By the media guidance application alter the media content on the user interface for the self-driving vehicle, the media guidance application may alter the user interface of the self-driving vehicle based on movements of the user.

In some embodiments, the media guidance application may, when altering the media content on the user interface for the self-driving vehicle, alter the user interface, from a first user interface to a second user interface, wherein the second user interface comprises a translucent user interface. For example, the user who grabs the steering wheel by not exceeding the threshold value, may wish to have visibility of the road ahead but also simultaneously watch the current media. In some embodiments, the display for the media playback will alter to a user interface which is translucent which allows for visibility of the road ahead. This may be because the user does not sense an emergency but rather wishes to augment the media content display and/or playback. By the media guidance application determining whether to alter the user interface, from a first user interface to a second user interface, the media guidance application may alter user interfaces of self-driving vehicles based on movements of passengers in the self-driving vehicles in various degrees more than active and removed. FIG. 4 shows an illustrative embodiment 400 of a modified user interface 410 of a self-driving vehicle displaying media content where the movement 460 from the wearable user device 430 does not exceed a threshold value. The user of the self-driving vehicle has one hand 440 on the steering wheel 420 while the other hand 450 is casually relaxed. The user interface generated for display includes The Matrix which is shown with a transparency effect such that the user of the self-driving vehicle can view through the windshield and make a determination of what lies ahead on the road, while simultaneously viewing the media content. In the examples of FIG. 4 and FIG. 5, the user if very gently touching the steering wheel will launch the user interface shown in FIG. 5 (much below the threshold). Similarly, if greater movement is detected by the user (but still below threshold), this may indicate that the user wishes to have a view of what is happening on the road ahead without interruption of the media content.

In some embodiments, the media guidance application may detect a second movement from the wearable user device within a third threshold proximity. For example, the user may revert his arms back to assuming a relaxed posture where both arms are away from the reference point (e.g., steering wheel). By the media guidance application detecting a second movement from the wearable user device within a third threshold proximity, the media guidance application may further alter the user interface of the self-driving vehicle based on movements of the user.

In some embodiments, the media guidance application may, in response to detecting the second movement from the wearable user device within the third threshold proximity, revert the user interface from the second user interface to the first user interface. For example, after the user assumes the relaxed posture, the application will revert the user interface to playing The Matrix with no translucence in the display. By the media guidance application detecting a second movement from the wearable user device within a third threshold proximity, the media guidance application may further alter the user interface of the self-driving vehicle based on movements of the user.

In some embodiments, the media guidance application may, when retrieving a threshold value, wherein the threshold value indicates a maximum value at which the self-driving vehicle changes from the first mode to the second mode, retrieve the current speed of the self-driving vehicle. For example, if the user is travelling at a high rate of speed such as 80 mph in the self-driving vehicle, the application would retrieve the rate of speed from the self-driving vehicle. By the media guidance application determining whether to retrieve the current speed of the self-driving vehicle, the media guidance application receives information to determine a threshold value to measure movements of passengers in the self-driving vehicles with increased accuracy.

In some embodiments, the media guidance application may determine the threshold value based on the current speed of the self-driving vehicle, wherein the threshold value varies with speed of the self-driving vehicle. For example, if the user is travelling at a high rate of speed such as 80 mph in the self-driving vehicle, the retrieved threshold value may scale by a factor relative to the current speed. In some embodiments, the threshold value is less when the speed is greater, and the threshold value is greater when the speed is lower. By the media guidance application determining whether to retrieve the current speed of the self-driving vehicle, the media guidance application receives information to determine a threshold value to measure movements of passengers in the self-driving vehicles with increased accuracy.

In some embodiments, the media guidance application may, when retrieving a threshold value, wherein the threshold value indicates a maximum value at which the self-driving vehicle changes from the first mode to the second mode, retrieve user metadata of a user from a database based on a user profile, wherein the retrieved user metadata includes historical driving based metadata of the user. For example, if the user is travelling at a high rate of speed such as 80 mph in the self-driving vehicle, the media guidance application would retrieve the user metadata (e.g., based on the user identifier). In some embodiments, the metadata may relate to the user's driving history. By the media guidance application retrieving user metadata of a user from a database based on a user profile, the media guidance application receives information to determine a threshold value to measure movements of passengers in the self-driving vehicles with increased accuracy. In some embodiments, the metadata may relate to the user's individual driving history. In some embodiments, the metadata may relate to aggregate user of self-driving vehicles driving history.

In some embodiments, the media guidance application may determine the threshold value based on the historical driving based metadata of the user. For example, if the user routinely drives at 80 mph and there have been no instances of any alterations to the user interface in the last 2 months at this speed, the threshold value may be scaled by a certain factor. By the media guidance application retrieving user metadata of a user from a database based on a user profile, the media guidance application receives information to determine a threshold value to measure movements of passengers in the self-driving vehicles with increased accuracy.

In some embodiments, the media guidance application may, when retrieving a threshold value, wherein the threshold value indicates a maximum value at which the self-driving vehicle changes from the first mode to the second mode, retrieve the current location of the self-driving vehicle. For example, if the user is travelling through Long Beach, California, the application may retrieve the current location. By the media guidance application retrieving the current location of the self-driving vehicle, the media guidance application receives information to determine a threshold value to measure movements of passengers in the self-driving vehicles with increased accuracy.

In some embodiments, the media guidance application may determine the threshold value based on the current location of the self-driving vehicle, wherein the threshold value varies with location of the self-driving vehicle. For example, if the user is travelling through Long Beach, California, the media guidance application may retrieve the current location. Furthermore, the media guidance application may retrieve information of the location of the location from a database which may indicate that Long Beach has a high degree of reported incidences of traffic irregularities, road artifacts, and/or pedestrian traffic. Using this retrieved locational information, the media guidance application may scale the threshold value with the location of the self-driving vehicle. By the media guidance application retrieving the current location, and information related to the location, of the self-driving vehicle, the media guidance application receives information to determine a threshold value to measure movements of passengers in the self-driving vehicles with increased accuracy.

In some embodiments, the guidance system application prevents accidents by altering user interfaces of self-driving vehicles based on movements of passengers in the self-driving vehicles. The guidance system application may play a multimedia device in first mode when a vehicle is running in auto-pilot mode. In some embodiments, the guidance system application may detect intent of the user to change modes using motion sensors within the self-driving vehicle cabin. For example, the motion sensor may detect the arms of the user reach for the wheel, and/or the back of the user lift from the back of the seat indicating a forward movement towards the steering wheel. The guidance system application may weigh all the received information from the motion sensors and compare this information to a pre-defined threshold to determine whether to play the multimedia device in second mode from the first mode (e.g., when the vehicle may switch from auto-pilot mode to the user taking manual control, where the second mode would disengage the media being displayed on the inside windscreen (e.g., mode 1) and be relegated to the smaller display panel within the car (e.g., mode 2)).

In some embodiments, the guidance system application may detect intent using a combination of various sensors (e.g., motion, infrared, radar, signal strength, etc.) with predictive analytics stored in a database for the specific user of the self-driving vehicle. The guidance system application may, in response to the detecting the intent of the user, play the multimedia device in second mode when the vehicle is about to enter in to the manual-control mode. For example, the guidance system application may receive information from the motion sensors which is given a pre-defined weight. The guidance system application may also receive signal strength from the wearable user device at two different timestamps which is given a pre-defined weight. The guidance system application may weigh all the received information from the plurality of sensors and compare this information to a pre-defined threshold to determine whether to play the multimedia device in second mode from the first move (e.g., when the vehicle may switch from auto-pilot mode to the user taking manual control).

In some embodiments, the second mode may include adjusting the audio from a first volume level to a second volume level. For example, if the guidance system application switches from a first mode to a second mode based on a value of the movement falling within the limits of a second threshold proximity, the guidance system application alters the media content by lowering the volume by 60 percent. This may give the user enhanced environmental awareness to listen to the outdoor audial environment without being fully disengaged from the media asset.

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices. The media guidance application may interface with the media guidance application to send and/or receive information in relation to media content and/or other functionality performed by the media guidance application. For example, both of the media guidance application and the media guidance application may be local to the user equipment device. In some embodiments, the media guidance application may be interfaced with via a communication network.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 6:
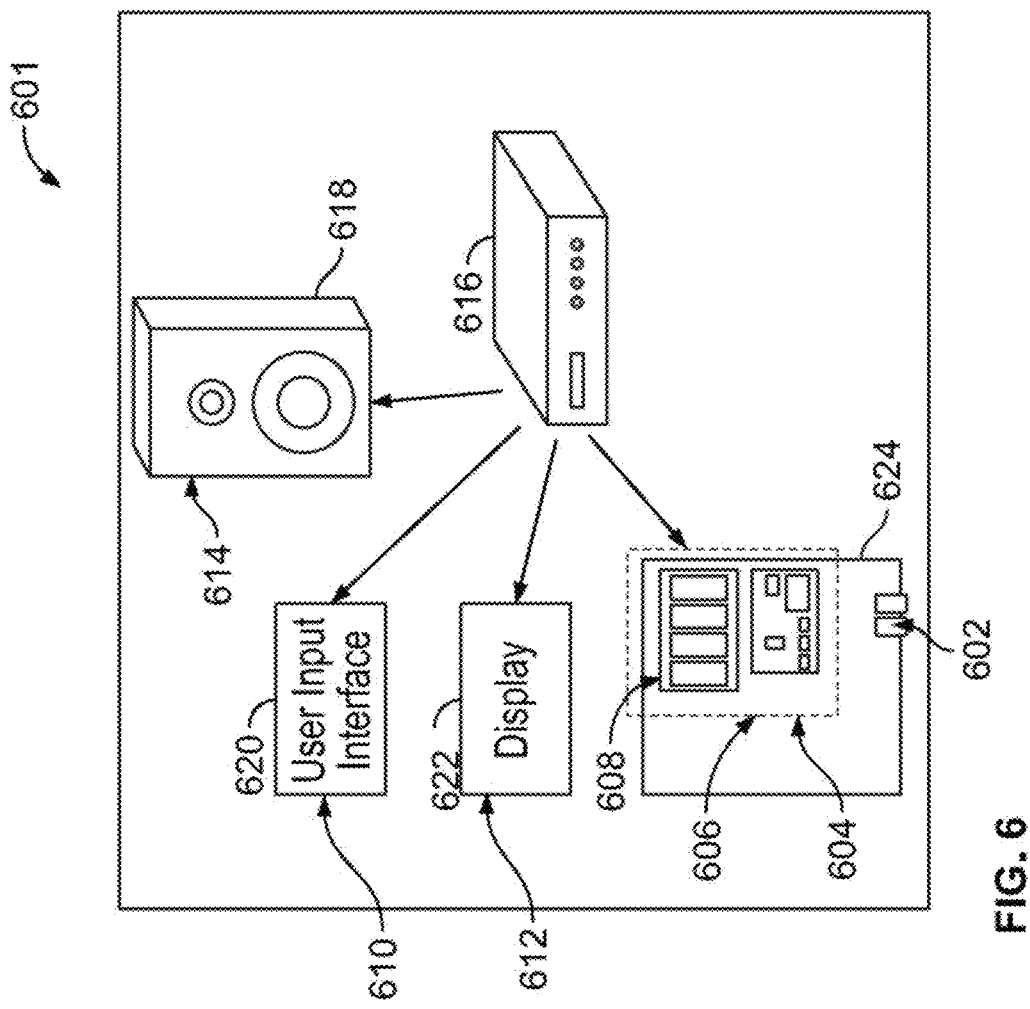
FIG. 6 is a block diagram of an illustrative user equipment (UE) device, in accordance with some embodiments of the disclosure.
Figure 6:
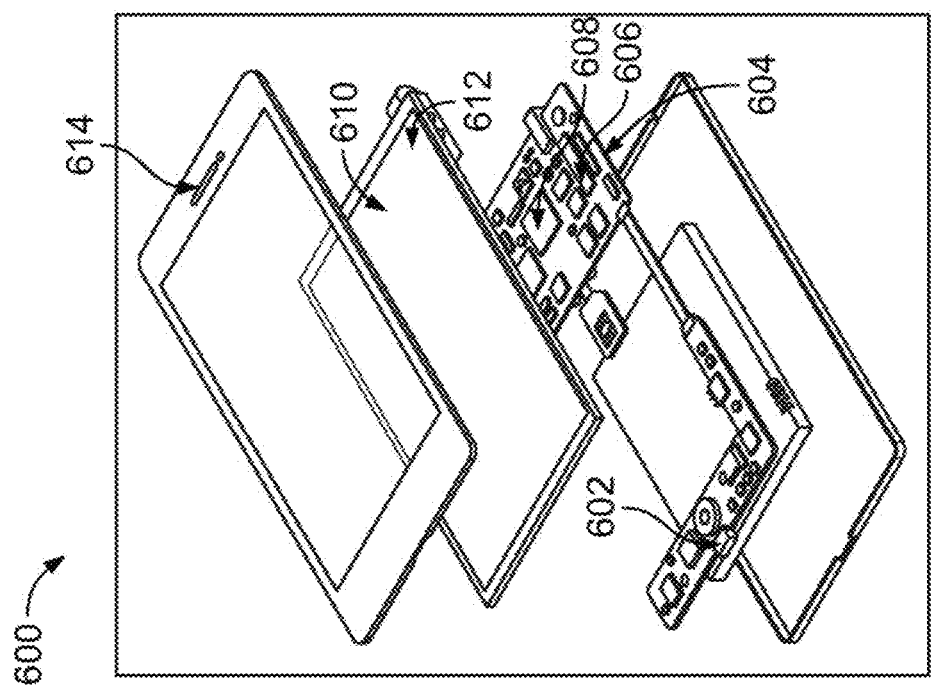

Users may access content and the media guidance application (and its display screens described above and below) from one or more of their user equipment devices. FIG. 6 shows generalized embodiments of illustrative user equipment device 600 and illustrative user equipment system 601. For example, user equipment device 600 can be a smartphone device. In another example, user equipment system 601 can be a user television equipment system. In another example, user equipment system 601 may be in-vehicle entertainment system and/or vehicle control system. User equipment system 601 may comprise a set top box 616. Set top box 616 may be communicatively connected to speaker 618 and display 622. In some embodiments, display 622 may be a television display or a computer display. In some embodiments, set top box 616 may be communicatively connected to user interface input 620. In some embodiments, user interface input 620 may be a remote control device. Set top box 616 may include circuit board 624. In some embodiments, circuit board 624 may include processing circuitry, control circuitry, and storage (e.g., RAM, ROM, Hard Disk, Removable Disk, etc.). In some embodiments, circuit board 624 may include an input/output path. More specific implementations of user equipment devices are discussed below in connection with FIG. 7. Each one of user equipment device 600 and user equipment system 601 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application and/or guidance system application to perform the functions discussed above and below. In some embodiments, the guidance system application communicates through the media guidance application. In yet other embodiments, the guidance system application may retrieve information from the media guidance application and perform actions. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of each one of user equipment device 600 and user equipment system 601. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from each one of user equipment device 600 and user equipment system 601, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment system 601. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of each one of user equipment device 600 and user equipment system 601 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on each one of user equipment device 600 and user equipment system 601. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on each one of user equipment device 600 and user equipment system 601 is retrieved on-demand by issuing requests to a server remote to each one of the user equipment device 600 and the user equipment system 601. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on each one of equipment device 600 and equipment system 601. This way, the processing of the instructions is performed remotely by the server while the resulting displays are provided locally on each one of equipment device 600 and equipment system 601. Each one of equipment device 600 and equipment system 601 may receive inputs from the user via input interface 610 and transmit those inputs to the remote server for processing and generating the corresponding displays. For example, each one of equipment device 600 and equipment system 601 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to each one of equipment device 600 and equipment system 601 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
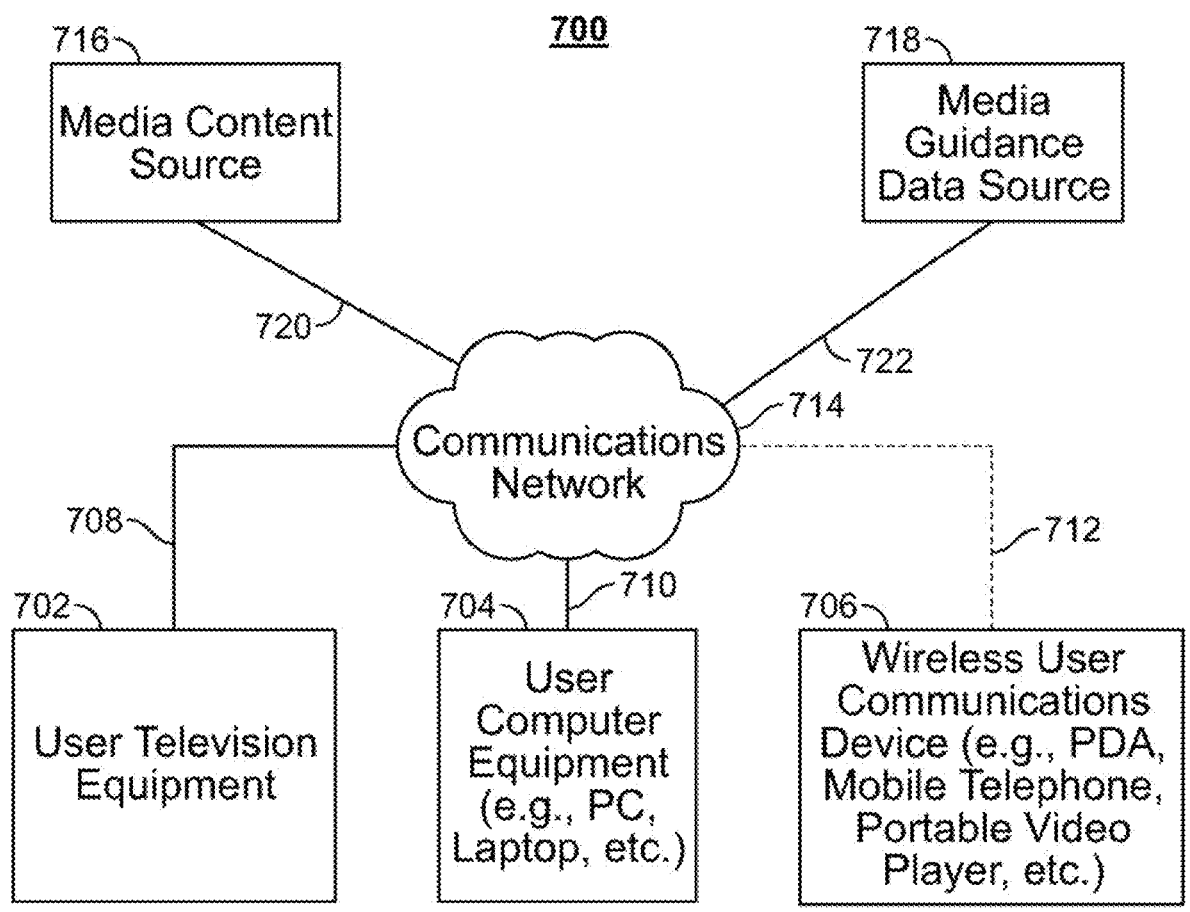
FIG. 7 is a block diagram of an illustrative media system, in accordance with some embodiments of the disclosure.

Each one of user equipment device 600 and user equipment system 601 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of each one of a user equipment device 600 and 601. In some embodiments, media guidance applications may be client-server applications where only a client application resides on the user equipment device, and server application resides on a remote server. For example, media guidance applications may be implemented partially as a client application on control circuitry 604 of each one of user equipment device 600 and user equipment system 601 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Guidance system application 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
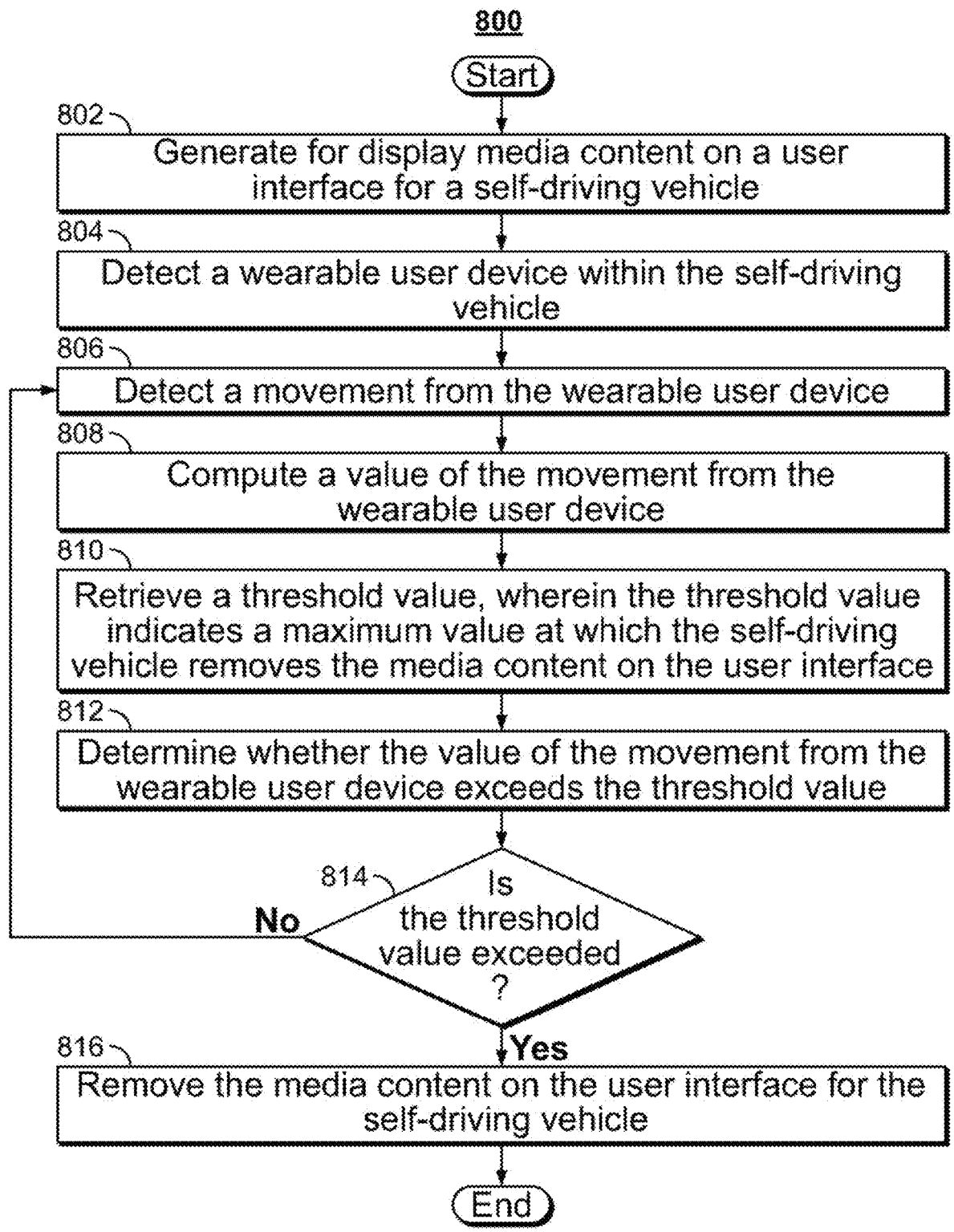
FIG. 8 is a flowchart of a process for preventing accidents by altering user interfaces of self-driving vehicles based on movements of passengers in the self-driving vehicles, in accordance with some embodiments of the disclosure.

FIG. 8 depicts an illustrative flowchart of a process 800 for preventing accidents by altering user interfaces of self-driving vehicles based on movements of passengers in the self-driving vehicles, in accordance with some embodiments of the disclosure. Process 800, and any of the following processes, may be executed by control circuitry 604 (e.g., in a manner instructed to control circuitry 604 by the guidance system application). Control circuitry 604 may be part of user equipment (e.g., user equipment 108, which may have any or all of the functionality of user television equipment 702, user computer equipment 704, and/or wireless communications device 706), or of a remote server separated from the user equipment by way of communication network 714, or distributed over a combination of both.

At 802, control circuitry 604 generates for display media content on a user interface 620 for a self-driving vehicle. For example, the user computer equipment 704 (e.g., self-driving vehicle's entertainment system) generates a movie to be displayed on the inside of the self-driving vehicle's windshield. Further details of control circuitry 604 generating for display media content on a user interface 620 for a self-driving vehicle can be found in the description of FIGS. 10 and 11.

At 804, control circuitry 604 detects a wearable user device 706 within the self-driving vehicle. In some embodiments, the wearable user device 706 is a smartwatch worn by the user of the self-driving vehicle sitting in the driver's seat. In some embodiments, the guidance system application, by control circuitry 604, authenticates the wearable user device 706 authenticates with the self-driving vehicle through the communications network 714.

At 806, control circuitry 604 detects a movement from the wearable user device 706. In some embodiments, the guidance system application detects movement by receiving information provided by sensors of the wearable user device 706 such as acceleration monitored by accelerometers. In some embodiments, the position of the wearable user device 706 is measured by the difference in positioning using a near field communication (e.g., Bluetooth, NFC, etc.) signal strength.

At 808, control circuitry 604 computes a value of the movement from the wearable user device. In some embodiments, the guidance system application receives information retrieved from the wearable user device 706, through the communications network 714. In some embodiments, the computation of the value of the movement is performed by processing circuitry 606. Further details of control circuitry 604 computing a value of the movement from the wearable user device can be found in the description of FIG. 9.

At 810, control circuitry 604 retrieves a threshold value, wherein the threshold value indicates a maximum value at which the self-driving vehicle removes the media content on the user interface. Further details of the retrieval of the threshold value can be found in the description of FIGS. 15, 16, and 17.

At 812, control circuitry 604 determines whether the value of the movement from the wearable user device 706 exceeds the threshold value. If at 814, control circuitry determines "No," the value of the movement from the wearable user device 706 does not exceed the threshold value, the process reverts to step 806.

If, at 814, control circuitry 604 detects that "Yes," the value of the movement from the wearable user device 706 exceeds the threshold value, the process advances to 816. At 816, control circuitry 604 removes the media content on the user interface for the self-driving vehicle. Further details of removal of the media content on the user interface for the self-driving vehicle can be found in the description of FIG. 13.

Figure 9:
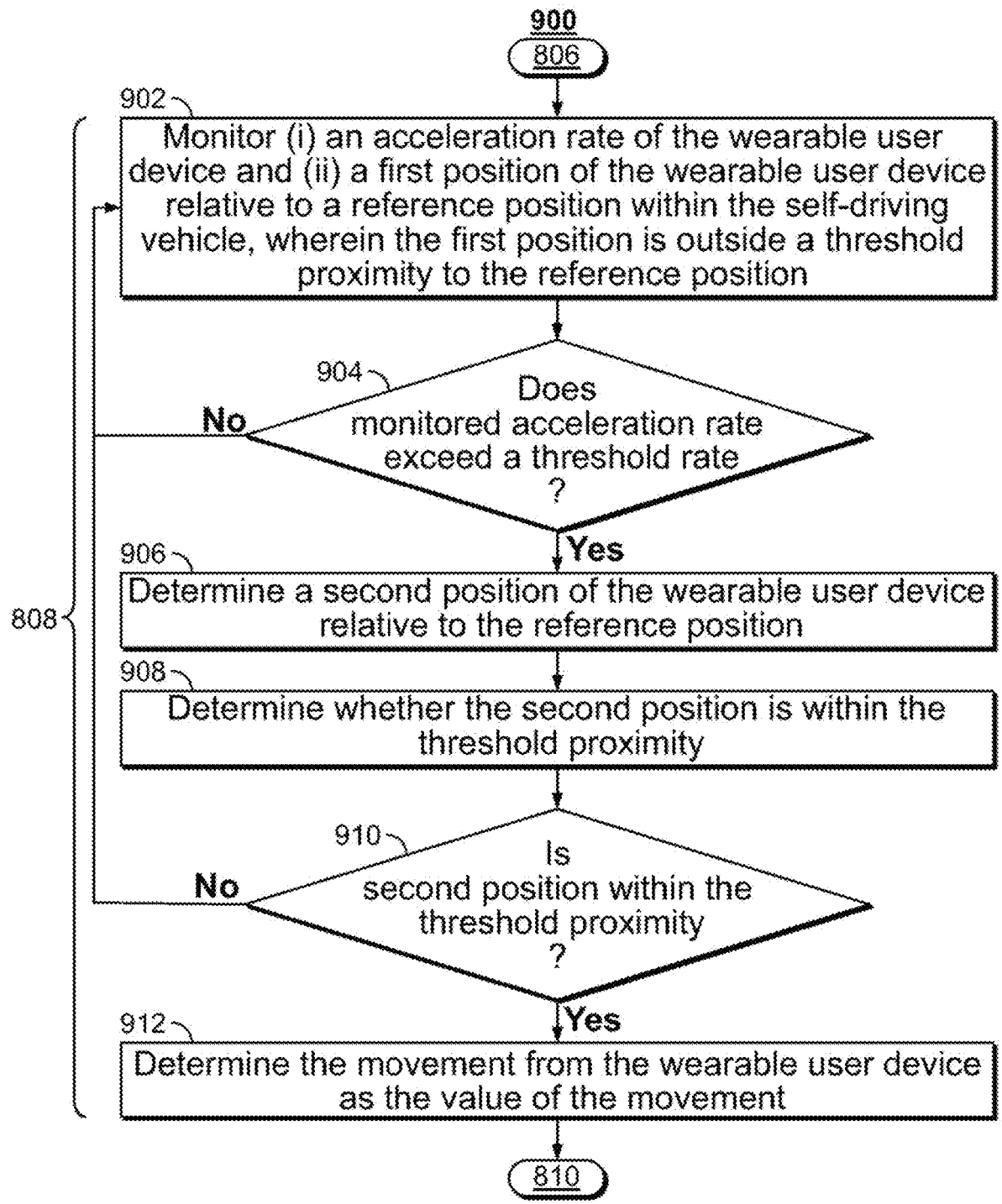
FIG. 9 is a flowchart of a process for computing the value of the movement from the wearable user device, in accordance with some embodiments of the disclosure.

FIG. 9 depicts an illustrative flowchart of a process 900 for computing the value of the movement from the wearable user device, in accordance with some embodiments of the disclosure. At 902, control circuitry 604 monitors (i) an acceleration rate of the wearable user device and (ii) a first position of the wearable user device relative to a reference position within the self-driving vehicle, wherein the first position is outside a threshold proximity to the reference position. In some embodiments, the guidance system application on the user equipment 704, receives information retrieved from the wearable user device 706, through the communications network 714. In some embodiments, the wearable user device 706 includes accelerometers to measure acceleration. In some embodiments, the wearable user device 706 includes near field communication which measures position relative to a reference point using signal strength.

At 904, control circuitry 604 calculates, whether the monitored acceleration rate exceeds a threshold rate. If at 904, control circuitry determines "No," the value of the movement from the wearable user device 706 does not exceed the threshold value, the process reverts to step 902.

If, at 904, control circuitry 604 detects that "Yes," the value of the movement from the wearable user device 706 exceeds the threshold value, the process advances to 906. At 906, control circuitry 604 determines a second position of the wearable user device relative to the reference position. In some embodiments, the wearable user device 706 includes accelerometers to measure acceleration. In some embodiments, the wearable user device 706 includes near field communication which measures position relative to a reference point using signal strength.

At 908, control circuitry 604 determines whether the second position is within the threshold proximity. In some embodiments, the determination of whether the second position is within the threshold proximity is performed by the processing circuitry 606. If at 910, control circuitry determines "No," the second position is not within the threshold proximity, the process reverts to step 902.

If at 910, control circuitry determines "Yes," the second position is within the threshold proximity, the process continues to 912. At 912, control circuitry 604 determines the movement from the wearable user device as the value of the movement. In some embodiments, the determination of the movement from the wearable user device as the value of the movement, is performed by the processing circuitry 606.

Figure 10:
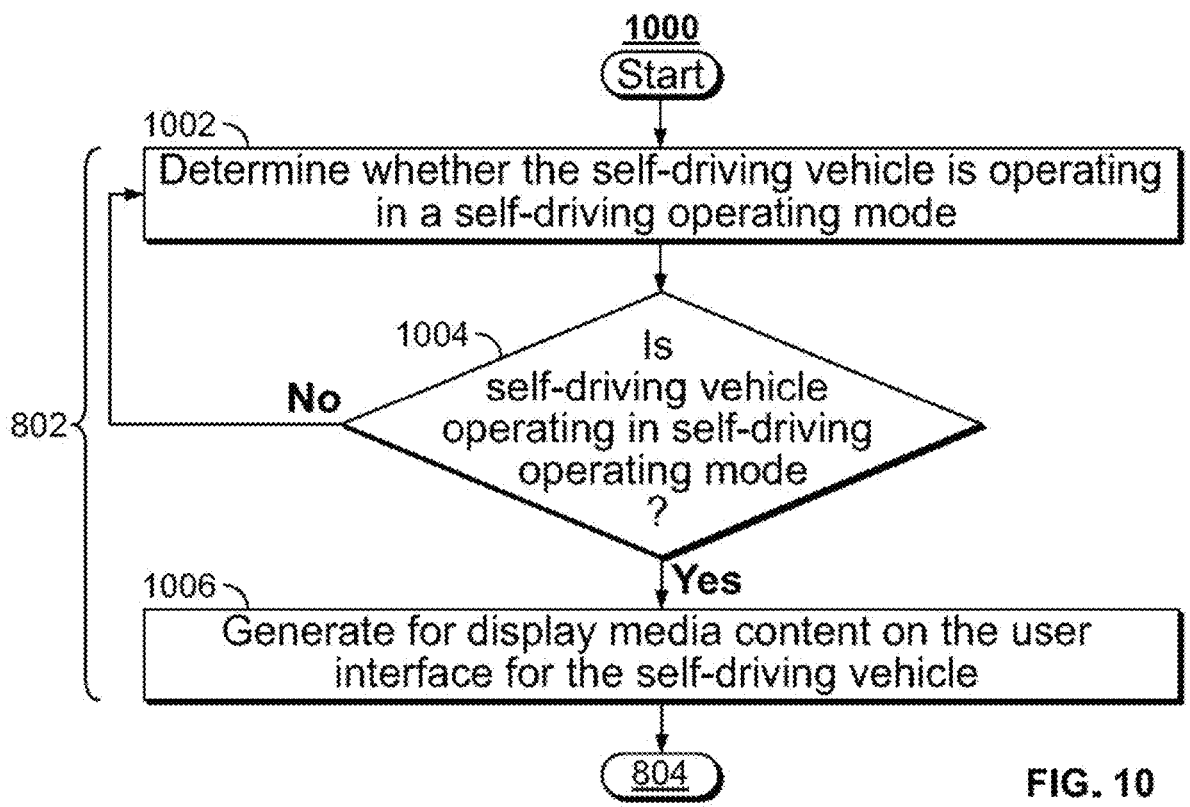
FIG. 10 is a flowchart of a process for generating for display media content on the user interface for the self-driving vehicle, in accordance with some embodiments of the disclosure.

FIG. 10 depicts an illustrative flowchart of a process 1000 for generating for display media content on the user interface for the self-driving vehicle, in accordance with some embodiments of the disclosure. At 1002, control circuitry 604 determines whether the self-driving vehicle is operating in a self-driving operating mode. In some embodiments, the determination of the whether the self-driving vehicle is operating in a self-driving operating mode, is performed by the processing circuitry 606. If at 1004, control circuitry determines "No," the self-driving vehicle is not operating in a self-driving operating mode, the process reverts to step 1002.

If at 1002, control circuitry determines "Yes," the second position is within the threshold proximity, the process continues to 1006. At 1006, control circuitry 604 generates for display media content on the user interface for the self-driving vehicle. In some embodiments, the guidance system application, through control circuitry 604, retrieves the media content from the media content source 416 via the communications network 414.

Figure 11:
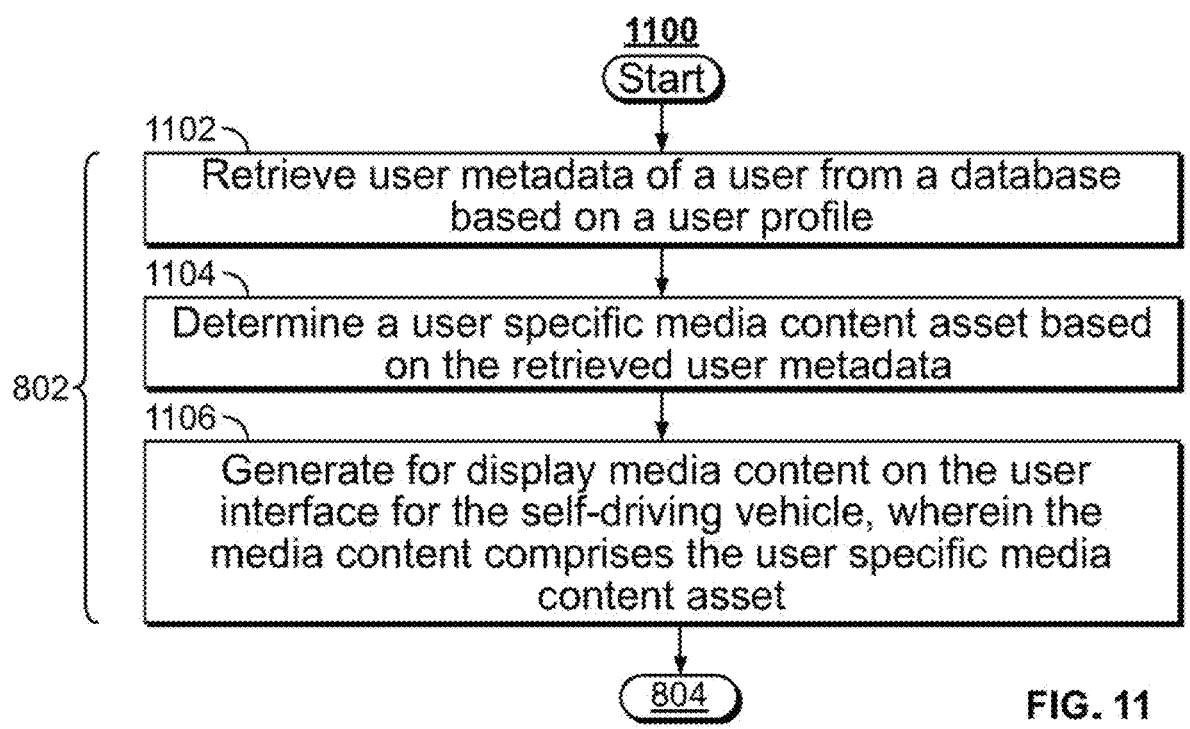
FIG. 11 is a flowchart of yet another process for generating for display media content on the user interface for the self-driving vehicle, in accordance with some embodiments of the disclosure.

FIG. 11 depicts an illustrative flowchart of yet another process 1100 for generating for display media content on the user interface for the self-driving vehicle, in accordance with some embodiments of the disclosure. At 1102, control circuitry 604 retrieves user metadata of a user from a database based on a user profile. In some embodiments, the guidance system application, by control circuitry 604, retrieves user metadata from the database within the user equipment 704. In some embodiments, the guidance system application, by control circuitry 604, retrieves user metadata from a wireless communications device 706 (e.g., a remote server containing aggregate user metadata) via the communications network 714. Further details of retrieving user metadata of a user from a database based on a user profile can be found in the description of FIG. 13.

At 1104, control circuitry 604 determines a user specific media content asset based on the retrieved user metadata. In some embodiments, the guidance system application determines user specific media content asset based on the retrieved user metadata, by processing circuitry 606. In some embodiments, the guidance system application, by control circuitry 604, retrieves the media content information from the user equipment 704. In some embodiments, the guidance system application, by control circuitry 604, retrieves the media content information from a media content source 716.

At 1106, control circuitry 604 generates for display media content on the user interface for the self-driving vehicle. The media content comprises the user specific media content asset. In some embodiments, the guidance system application, through control circuitry 604, retrieves the media content from the media content source 416 via the communications network 414.

Figure 12:
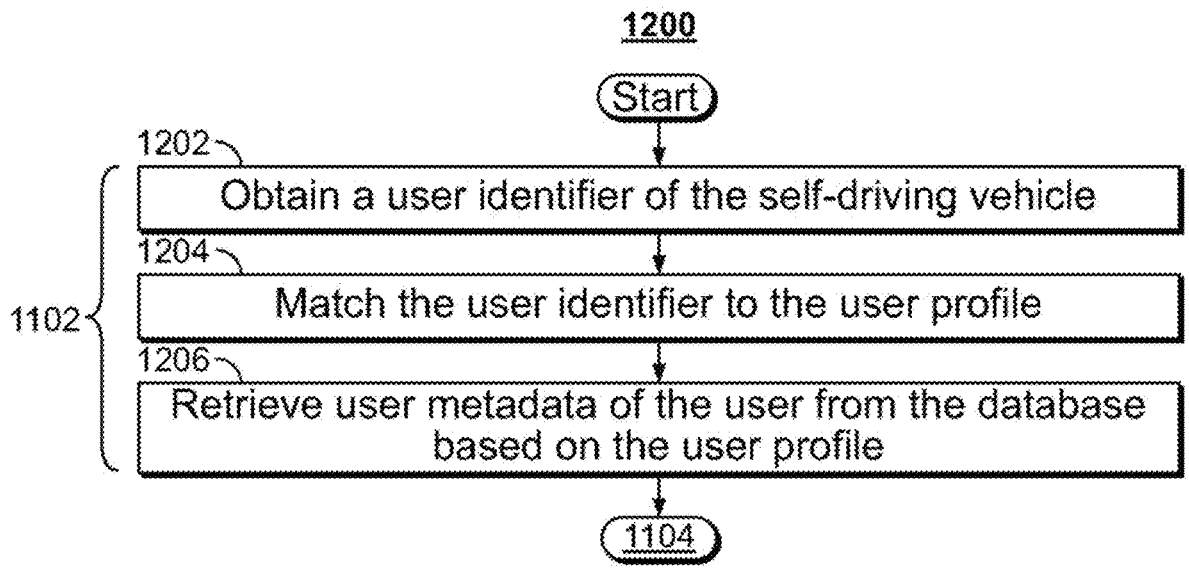
FIG. 12 is a flowchart of a process for retrieving user metadata of the user from the database based on the user profile, in accordance with some embodiments of the disclosure.

FIG. 12 depicts an illustrative flowchart of a process 1200 for retrieving user metadata of the user from the database based on the user profile, in accordance with some embodiments of the disclosure. At 1202, control circuitry 604 obtains a user identifier of the self-driving vehicle. In some embodiments, the guidance system application, by control circuitry 604, detects user identifier from the user computer equipment 704. In some embodiments, the guidance system application, by control circuitry 604, detects user identifier from a wireless user communications device 706.

At 1204, control circuitry 604 matches the user identifier to the user profile. In some embodiments, the guidance system application matches the user identifier to the user profile by processing circuitry 606. In some embodiments, the guidance system application, by control circuitry 604, retrieves the user profile from the user computer equipment 704. In some embodiments, the guidance system application, by control circuitry 604, retrieves the user profile from a wireless user communications device 706.

At 1206, control circuitry 604 retrieve user metadata of the user from the database based on the user profile. In some embodiments, the guidance system application, by control circuitry 604, retrieves user metadata from the database within the user equipment 704. In some embodiments, the guidance system application, by control circuitry 604, retrieves user metadata from a wireless communications device 706 (e.g., a remote server containing aggregate user metadata) via the communications network 714.

Figure 13:
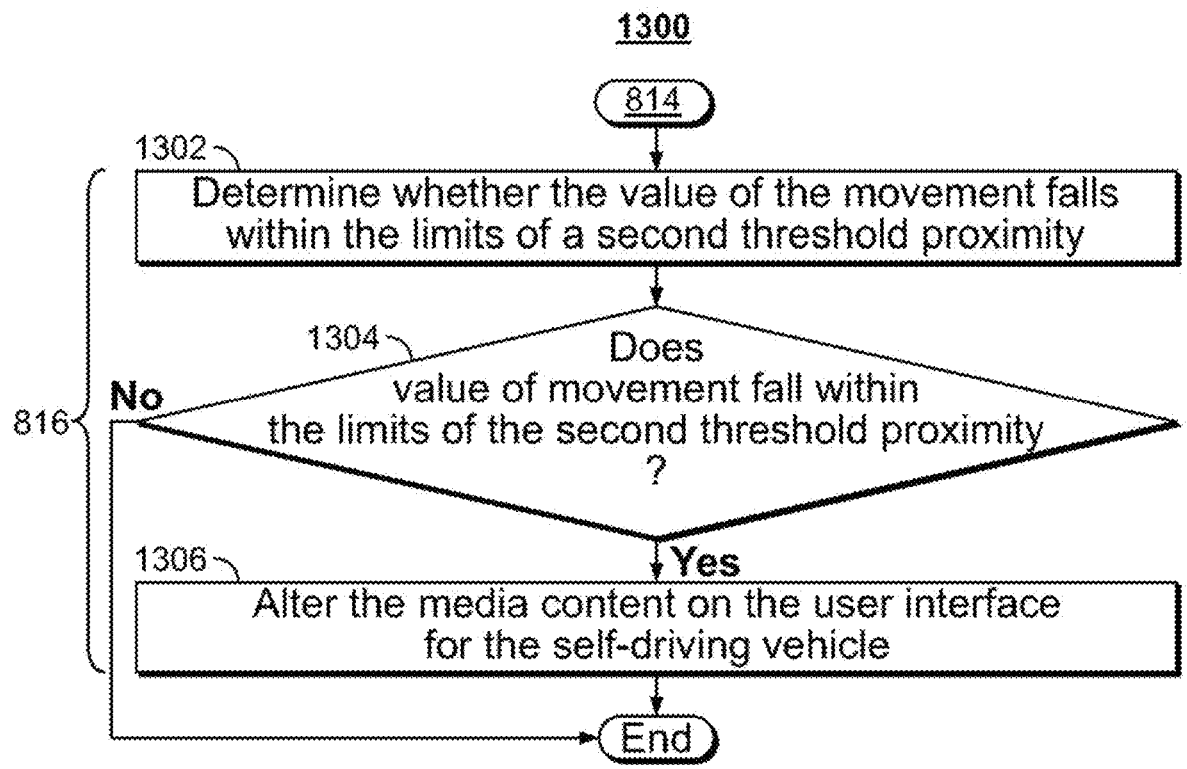
FIG. 13 is a flowchart of a process responsive to determining the value of the movement from the wearable user device does not exceed the threshold value, in accordance with some embodiments of the disclosure.

FIG. 13 depicts an illustrative flowchart of a process 1300 responsive to determining the value of the movement from the wearable user device does not exceed the threshold value, in accordance with some embodiments of the disclosure. At 1302, control circuitry 604, determines whether the value of the movement falls within the limits of a second threshold proximity. If at 1304, control circuitry determines "No," the value of the movement does not fall within the limits of a second threshold proximity, the process proceeds to "End."

If, at 1304, control circuitry 604 detects that "Yes," the value of the movement falls within the limits of a second threshold proximity, the process advances to 1306. At 1306, control circuitry 604 alters the media content on the user interface 620 for the self-driving vehicle. In some embodiments, the altering of the media content on the user interface 620 for the self-driving vehicle, is performed by processing circuitry 606. Further details of altering the media content on the user interface 620 for the self-driving vehicle can be found in the description of FIG. 14.

Figure 14:
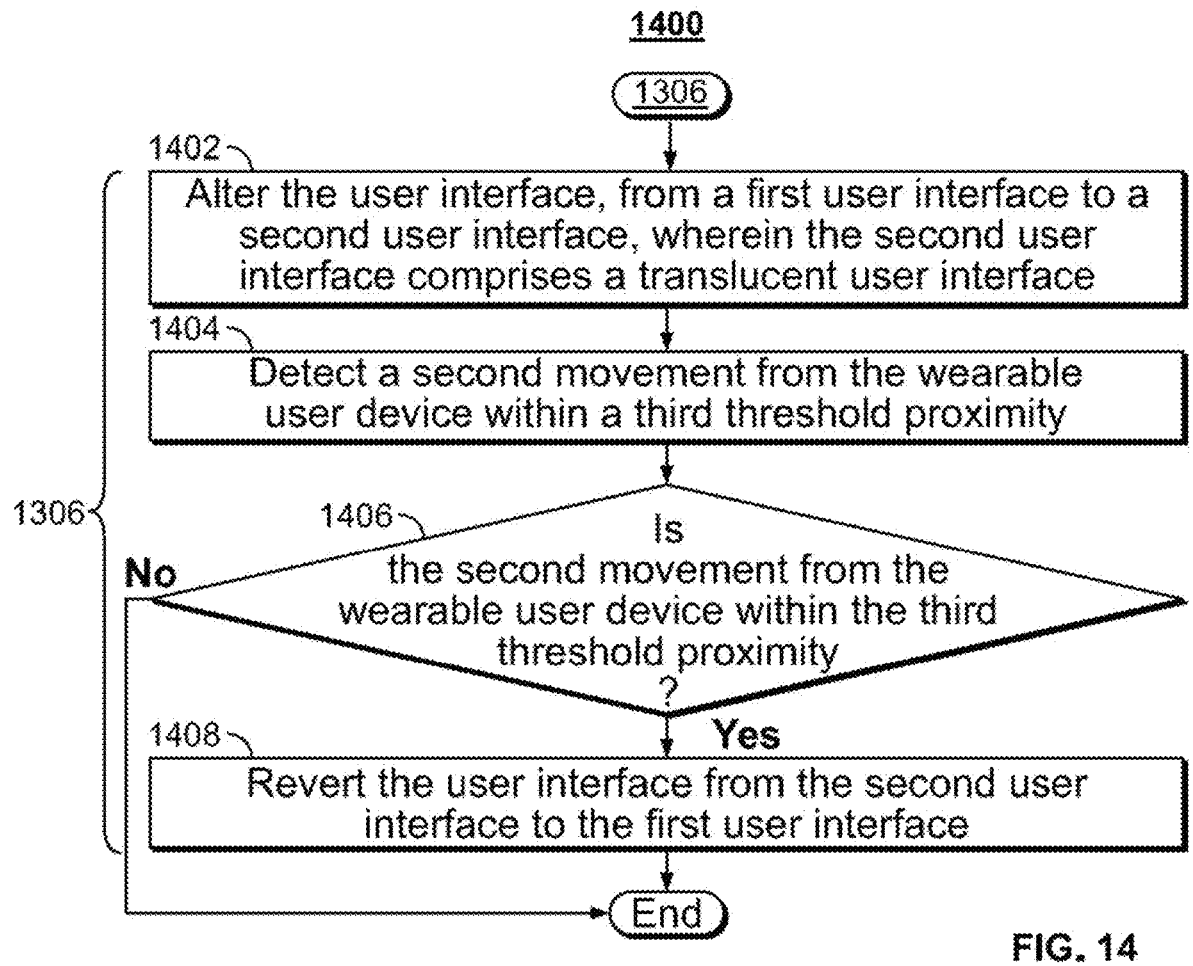
FIG. 14 is a flowchart of a process for altering the media content on the user interface for the self-driving vehicle, in accordance with some embodiments of the disclosure.

FIG. 14 depicts an illustrative flowchart of a process 1400 for altering the media content on the user interface for the self-driving vehicle, in accordance with some embodiments of the disclosure. At 1402, control circuitry 604, alters the user interface 620, from a first user interface to a second user interface. The second user interface comprises a translucent user interface. In some embodiments, the altering of the user interface is performed by processing circuitry 606.

At 1404, control circuitry 604 detects a second movement from the wearable user device 706 within a third threshold proximity. If at 1406, control circuitry determines "No," the second movement from the wearable user device is not within the third threshold proximity, the process proceeds to "End."

If, at 1406, control circuitry 604 detects that "Yes," the second movement from the wearable user device is within the third threshold proximity, the process advances to 1408. At 1408, control circuitry 604 reverts the user interface 610 from the second user interface to the first user interface. In some embodiments, the reverting of the user interface 610 from the second user interface to the first user interface, is performed by processing circuitry 606.

Figure 15:
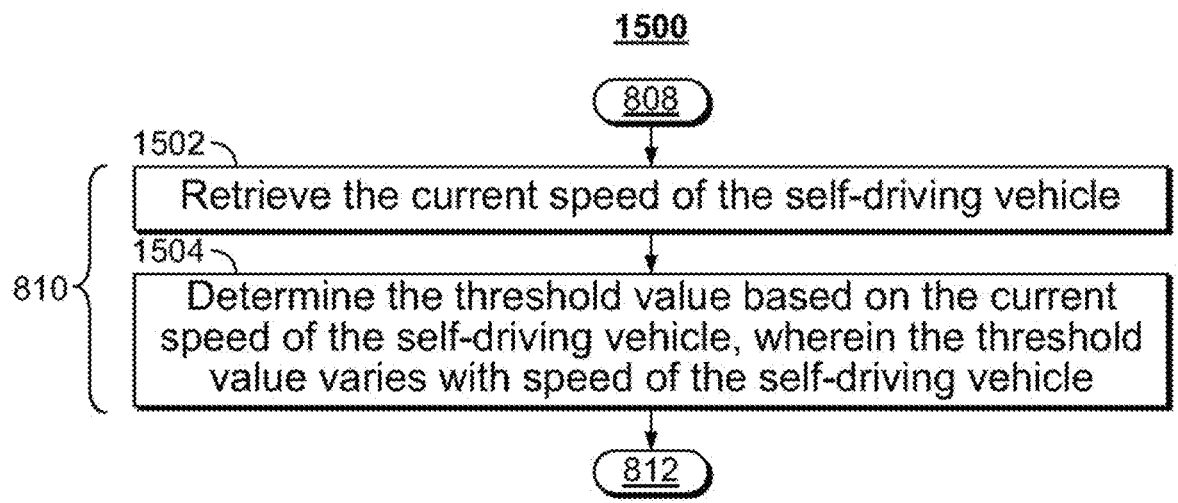
FIG. 15 is a flowchart of a process for retrieving a threshold value, wherein the threshold value indicates a maximum value at which the self-driving vehicle changes from the first mode to the second mode.

FIG. 15 depicts an illustrative flowchart of a process 1500 for retrieving a threshold value, wherein the threshold value indicates a maximum value at which the self-driving vehicle changes from the first mode to the second mode. At 1502, control circuitry 604 retrieves the current speed of the self-driving vehicle. In some embodiments, the guidance system application, through control circuitry 604, retrieves information related to the speed of the self-driving vehicle from the user computer equipment 704.

At 1504, control circuitry 604 determines the threshold value based on the current speed of the self-driving vehicle, wherein the threshold value varies with speed of the self-driving vehicle. In some embodiments, the guidance system application, through control circuitry 604, retrieves information related to the speed of the self-driving vehicle from the user computer equipment 704. In some embodiments, the threshold value is determined by processing circuitry 606.

Figure 16:
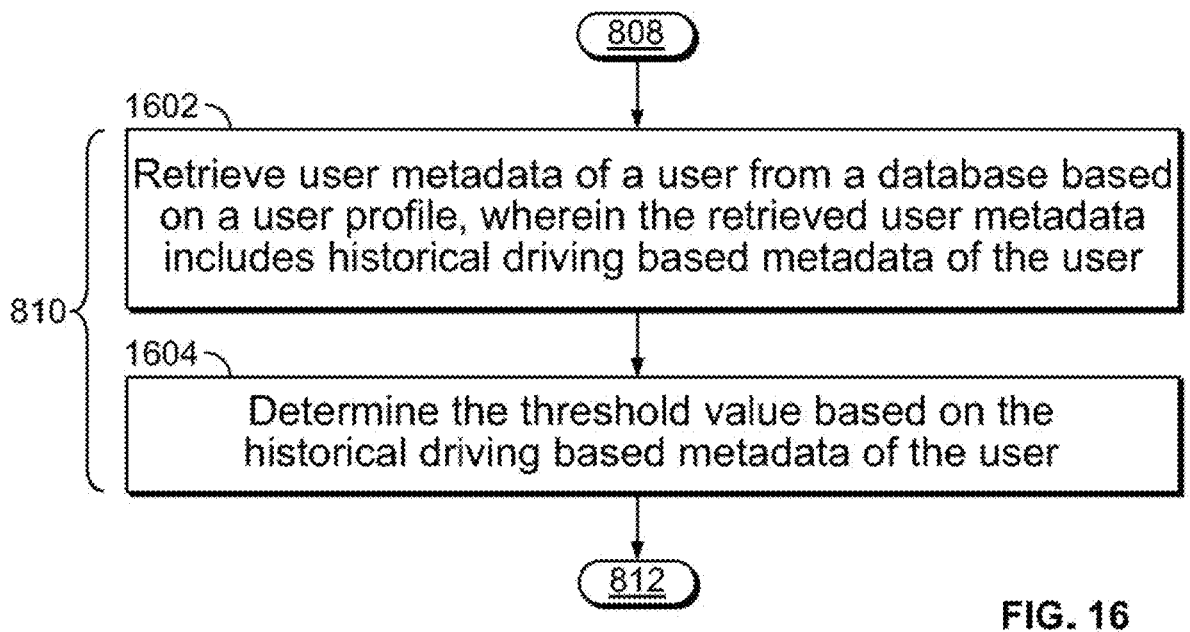
FIG. 16 is a flowchart of a process for retrieving a threshold value, wherein the threshold value indicates a maximum value at which the self-driving vehicle changes from the first mode to the second mode, in accordance with some embodiments of the disclosure.

FIG. 16 depicts an illustrative flowchart of a process 1600 for retrieving a threshold value, wherein the threshold value indicates a maximum value at which the self-driving vehicle changes from the first mode to the second mode, in accordance with some embodiments of the disclosure. At 1602, control circuitry 604 retrieves user metadata of a user from a database based on a user profile. The retrieved user metadata includes historical driving based metadata of the user. In some embodiments, the guidance system application, through control circuitry 604, retrieves user metadata from user computer equipment 704. In some embodiments, the guidance system application, through control circuitry 604, retrieves user metadata from a media content source 716 via the communications network 714.

At 1604, control circuitry 604 determines the threshold value based on the historical driving based metadata of the user. In some embodiments, the guidance system application, through control circuitry 604, retrieves historical driving based metadata from user computer equipment 704. In some embodiments, the guidance system application, through control circuitry 604, retrieves historical driving based metadata from a media content source 716 via the communications network 714.

Figure 17:
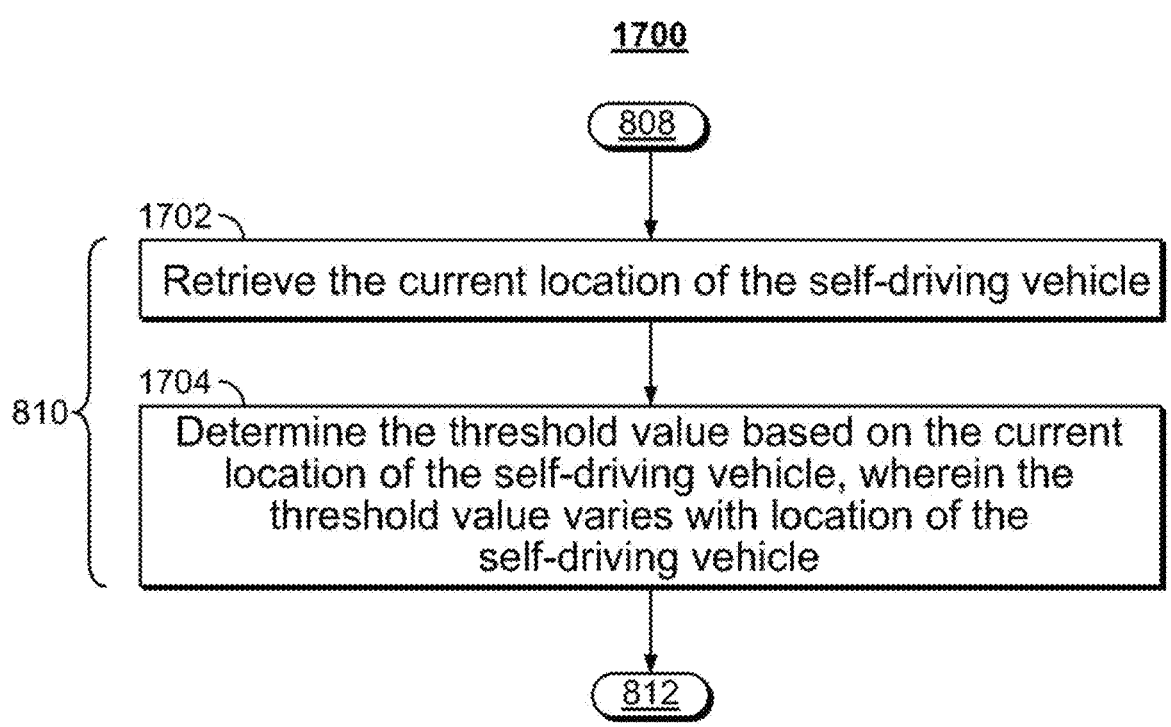
FIG. 17 is a flowchart of yet another process for retrieving a threshold value, wherein the threshold value indicates a maximum value at which the self-driving vehicle changes from the first mode to the second mode, in accordance with some embodiments of the disclosure.

FIG. 17 depicts an illustrative flowchart of yet another process for retrieving a threshold value, wherein the threshold value indicates a maximum value at which the self-driving vehicle changes from the first mode to the second mode, in accordance with some embodiments of the disclosure. At 1702, retrieve the current location of the self-driving vehicle. In some embodiments, the location is received from the user computer equipment 702. In some embodiments, the location is received from a wireless user communications 706.

At 1704, control circuitry 604 determines the threshold value based on the current location of the self-driving vehicle. The threshold value varies with location of the self-driving vehicle. In some embodiments, the guidance system application, through control circuitry 604, retrieves location information from user computer equipment 704.

It is contemplated that the steps or descriptions of FIGS. 8-17 may be used with any other embodiment of this disclosure. In addition, the steps and descriptions described in relation to FIGS. 8-17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIGS. 8-17.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting movement of a wearable user device inside a self-driving vehicle;
   based on the detected movement, determining that (a) a user is present in the self-driving vehicle, (b) the vehicle is engaged in a self-driving mode, and (c) the user has assumed a relaxed posture;
   obtaining metadata of the user wearing the wearable user device inside the self-driving vehicle;
   determining based on the metadata obtained, that the user has partially consumed a media asset on a second device that is not related to the self-driving vehicle; and
   in response to the determination of (a) the user having partially consumed the media asset on the second device, (b) the vehicle being engaged in the self-driving mode, and (c) the user having assumed the relaxed posture:
      resuming play of the media asset wherein the play is resumed on a user interface of the self-driving vehicle.

2. The method of claim 1, further comprising:
   determining a setting configured on the second device on which the media asset was partially consumed; and
   applying the same setting configured on the second device on the user interface of the self-driving vehicle for resuming play of the partially consumed media asset.

3. The method of claim 1, further comprising, retrieving the metadata that indicates that the user has partially consumed the media asset from a remote media content source.

4. The method of claim 3, wherein the metadata retrieved identifies the media asset that is partially consumed.

5. The method of claim 1, further comprising:
   obtaining a user identifier of the self-driving vehicle and a user profile of the user wearing the wearable user device;
   matching the user identifier to the user profile; and
   implementing the media asset on the user interface of the self-driving vehicle based on the matching the user identifier to the user profile.

6. The method of claim 5, wherein the user identifier is a biometric login to the self-driving vehicle.

7. The method of claim 1, further comprising:
   accessing a user profile associated with the user;
   determining media content preferences based on the accessed user profile;
   determining a top selection media asset of the user based on the user profile; and
   implementing the top selection media asset on the user interface of the self-driving vehicle.

8. The method of claim 1, further comprising:
   detecting a measured acceleration value of the wearable user device that is inside the self-driving vehicle;
   determining that the measured acceleration value of the wearable device exceeds a threshold rate of acceleration inside the self-driving vehicle; and
   in response to the determination, stopping the resumed play of the media asset.

9. The method of claim 1, wherein determining that (b) the vehicle is engaged in a self-driving mode, and (c) the user has assumed a relaxed posture comprises:
determining, based on the detected movement of the wearable device, that the user has moved their arm away from a steering wheel of the self-driving vehicle.

10. A system comprising:
communication circuitry to communicate with a wearable device within a self-driving vehicle; and
control circuitry configured to:
detect movement of a wearable user device inside a self-driving vehicle;
based on the detected movement, determine that (a) a user is present in the self-driving vehicle, (b) the vehicle is engaged in a self-driving mode, and (c) the user has assumed a relaxed posture;
obtaining metadata of the user wearing the wearable user device inside the self-driving vehicle;
determine based on the metadata obtained, that the user has partially consumed a media asset on a second device that is not related to the self-driving vehicle; and
in response to the determination of (a) the user having partially consumed the media asset on the second device, (b) the vehicle being engaged in the self-driving mode, and (c) the user having assumed the relaxed posture:
resume play of the media asset wherein the play is resumed on a user interface of the self-driving vehicle.

11. The system of claim 10, further comprising, the control circuitry configured to:
determine a setting configured on the second device on which the media asset was partially consumed; and
apply the same setting configured on the second device on the user interface of the self-driving vehicle for resuming play of the partially consumed media asset.

12. The system of claim 10, further comprising, the control circuitry configured to retrieve the metadata that indicates that the user has partially consumed the media asset from a remote media content source.

13. The system of claim 12, wherein the metadata retrieved by the control circuitry identifies the media asset that is partially consumed.

14. The system of claim 10, further comprising, the control circuitry configured to:
obtain a user identifier of the self-driving vehicle and a user profile of the user wearing the wearable user device;
match the user identifier to the user profile; and
implement the media asset on the user interface of the self-driving vehicle based on the matching the user identifier to the user profile.

15. The system of claim 14, wherein the user identifier is a biometric login to the self-driving vehicle.

16. The system of claim 10, further comprising, the control circuitry configured to:
access a user profile associated with the user;
determine media content preferences based on the accessed user profile;
determine a top selection media asset of the user based on the user profile; and
implement the top selection media asset on the user interface of the self-driving vehicle.

17. The system of claim 10, further comprising, the control circuitry configured to:
detect a measured acceleration value of the wearable user device that is inside the self-driving vehicle;
determine that the measured acceleration value of the wearable device exceeds a threshold rate of acceleration inside the self-driving vehicle; and
in response to the determination, stop playing of the resumed media asset.

18. The system of claim 10, wherein control circuitry is configured to determine that (c) the user has assumed a relaxed posture based on:
determining, based on the detected movement of the wearable device, that the user has moved their arm away from a steering wheel of the self-driving vehicle.

19. A system comprising:
communication circuitry to communicate with a wearable device within a self-driving vehicle; and
control circuitry configured to:
detect movement of a wearable user device inside a self-driving vehicle;
obtain metadata of the user wearing the wearable user device inside the self-driving vehicle;
determine based on the metadata obtained, that the user has partially consumed a media asset on a second device that is not related to the self-driving vehicle;
in response to determining that (a) the vehicle is not engaged in the self-driving mode and (b) the user has assumed an unrelaxed posture:
refrain from resuming play of the media asset;
in response to determining that (a) the vehicle is engaged in the self-driving mode and (b) the user has assumed an unrelaxed position:
refrain from resuming play of the media asset;
in response to determining that (a) the vehicle is engaged in the self-driving mode and (b) the user has assumed a relaxed position:
resume play of the media asset wherein the play is resumed on a user interface of the self-driving vehicle.

* * * * *